US012641572B2

(12) United States Patent　(10) Patent No.: US 12,641,572 B2
Luo et al.　(45) Date of Patent: May 26, 2026

(54) METHOD OF RESOURCE ACQUISITION, METHOD OF RESOURCE SCHEDULING, TERMINAL, SERVICE NODE, AND MEDIUM

(71) Applicant: ZTE Corporation, Shenzhen (CN)

(72) Inventors: Wei Luo, Shenzhen (CN); Boyuan Zhang, Shenzhen (CN); Mengzhen Wang, Shenzhen (CN); Lin Chen, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 428 days.

(21) Appl. No.: 17/916,442

(22) PCT Filed: May 31, 2021

(86) PCT No.: PCT/CN2021/097163
§ 371 (c)(1),
(2) Date: Sep. 30, 2022

(87) PCT Pub. No.: WO2021/197511
PCT Pub. Date: Oct. 7, 2021

(65) Prior Publication Data
US 2023/0143979 A1　May 11, 2023

(30) Foreign Application Priority Data

Apr. 2, 2020　(CN) ......................... 202010254879.8

(51) Int. Cl.
*H04W 72/02*　(2009.01)
*H04W 72/121*　(2023.01)
(Continued)

(52) U.S. Cl.
CPC ......... *H04W 72/02* (2013.01); *H04W 72/121* (2013.01); *H04W 72/25* (2023.01); *H04W 72/51* (2023.01); *H04W 72/54* (2023.01)

(58) Field of Classification Search
CPC ........ H04L 5/0094; H04W 4/44; H04W 4/46; H04W 4/50; H04W 72/02; H04W 72/121; H04W 72/25; H04W 72/51; H04W 72/54
See application file for complete search history.

(56) References Cited

U.S. PATENT DOCUMENTS

| | | |
|---|---|---|
| 7,171,471 B1 | 1/2007 | Nair |
| 2010/0235509 A1 | 9/2010 | Xia |

(Continued)

FOREIGN PATENT DOCUMENTS

| | | |
|---|---|---|
| CN | 109803385 A | 5/2019 |
| CN | 110225585 A | 9/2019 |

(Continued)

OTHER PUBLICATIONS

Japanese office action issued in JP Patent Application No. 2022-560022, dated Sep. 19, 2023, 3 pages. English translation included.

(Continued)

*Primary Examiner* — Awet Haile
(74) *Attorney, Agent, or Firm* — Perkins Coie LLP

(57) ABSTRACT

Provided are a method of resource acquisition, method for resource scheduling, terminal, serving node, and medium. The resource acquisition method is applied at a first terminal, including: receiving configuration information, transmitted by a second terminal, of an available resource set in a case where a predefined condition is satisfied; acquiring a target resource based on the configuration information of the available resource set, a target resource is used for transmitting service data.

18 Claims, 6 Drawing Sheets

(51) Int. Cl.
  *H04W 72/25* (2023.01)
  *H04W 72/51* (2023.01)
  *H04W 72/54* (2023.01)

(56) References Cited

U.S. PATENT DOCUMENTS

| | | | | |
|---|---|---|---|---|
| 2016/0338095 | A1 | 11/2016 | Faurie et al. | |
| 2017/0078866 | A1* | 3/2017 | Matsumoto | H04W 8/005 |
| 2019/0082459 | A1* | 3/2019 | Faurie | H04W 72/20 |
| 2019/0327747 | A1 | 10/2019 | Yang | |
| 2020/0267523 | A1* | 8/2020 | Tang | H04L 5/0044 |
| 2020/0288433 | A1* | 9/2020 | Yu | H04W 72/0446 |
| 2020/0389900 | A1* | 12/2020 | Lee | H04W 72/53 |
| 2020/0404560 | A1 | 12/2020 | Zhang et al. | |
| 2021/0274545 | A1* | 9/2021 | Adjakple | H04W 72/21 |
| 2022/0418036 | A1* | 12/2022 | Back | H04W 52/0216 |

FOREIGN PATENT DOCUMENTS

| | | | |
|---|---|---|---|
| CN | 110536260 | A | 12/2019 |
| CN | 111901783 | A | 11/2020 |
| EP | 3609259 | A1 | 2/2020 |
| KR | 102002807 | B1 | 7/2019 |
| WO | 2018188585 | A1 | 10/2018 |
| WO | 2021098101 | A1 | 5/2021 |

OTHER PUBLICATIONS

International Preliminary Report on Patentability issued in International Patent Application No. PCT/CN2021/097163, dated Sep. 29, 2022. 5 pages.

Indian examination report issued in IN Patent Application No. 202217061933, dated Jan. 17, 2024, 7 pages.

3rd Generation Partnership Project; Technical Specification Group Radio Access Network, "NR; Study on Vehicle-to-Everything (Release 16)," 3GPP TR 38.885 V1.1.0, Nov. 2018, 23 pages.

International Search Report and Written Opinion for International Application No. PCT/CN2021/097163, mailed on Sep. 1, 2021. 9 pages.

Chinese Search Report issued in CN Patent Application No. 2020102548798, dated Jul. 4, 2025, 4 pages. English translation included.

* cited by examiner

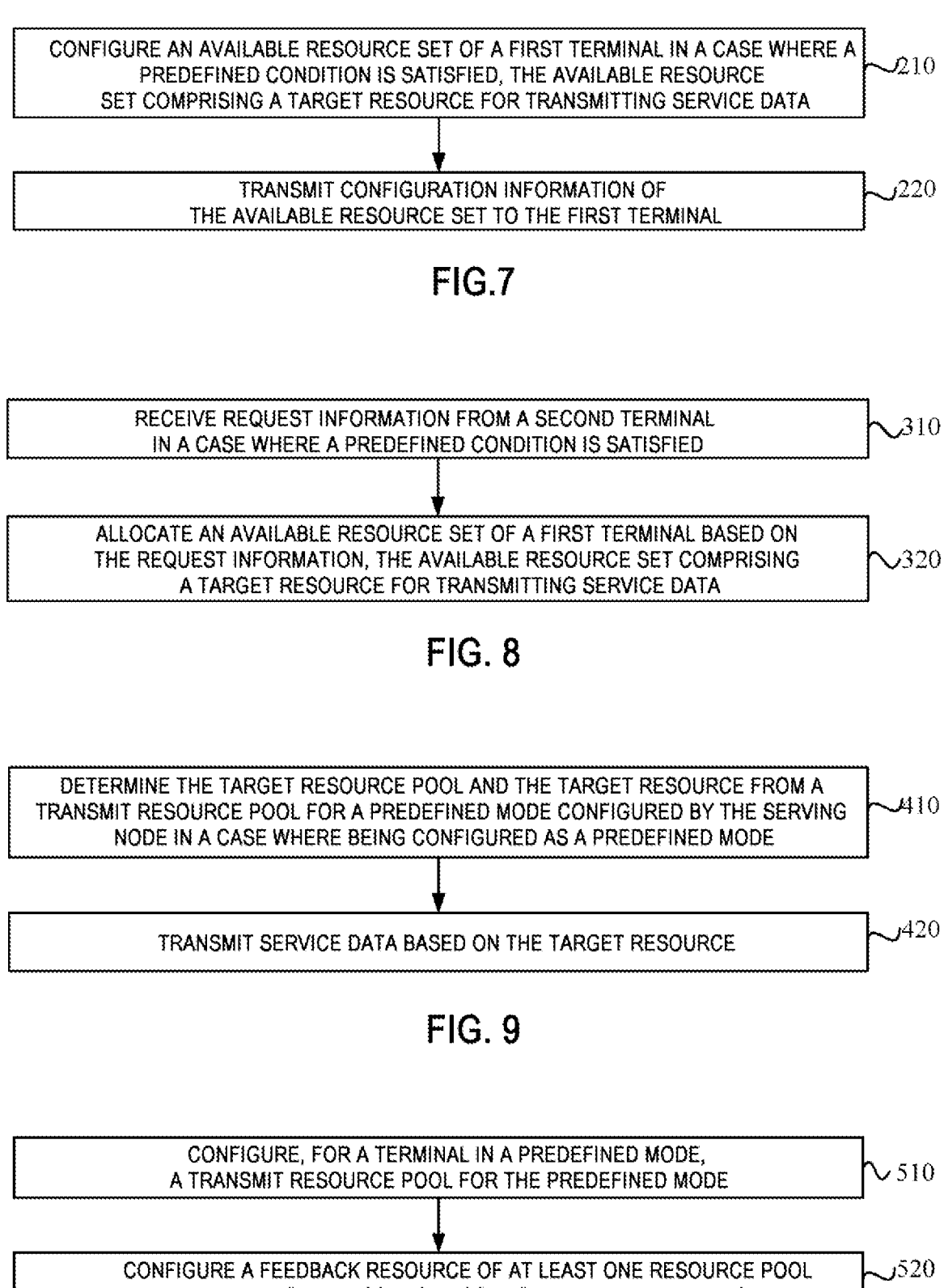

CONFIGURE AN AVAILABLE RESOURCE SET OF A FIRST TERMINAL IN A CASE WHERE A PREDEFINED CONDITION IS SATISFIED, THE AVAILABLE RESOURCE SET COMPRISING A TARGET RESOURCE FOR TRANSMITTING SERVICE DATA ~210

TRANSMIT CONFIGURATION INFORMATION OF THE AVAILABLE RESOURCE SET TO THE FIRST TERMINAL ~220

FIG. 7

RECEIVE REQUEST INFORMATION FROM A SECOND TERMINAL IN A CASE WHERE A PREDEFINED CONDITION IS SATISFIED ~310

ALLOCATE AN AVAILABLE RESOURCE SET OF A FIRST TERMINAL BASED ON THE REQUEST INFORMATION, THE AVAILABLE RESOURCE SET COMPRISING A TARGET RESOURCE FOR TRANSMITTING SERVICE DATA ~320

FIG. 8

DETERMINE THE TARGET RESOURCE POOL AND THE TARGET RESOURCE FROM A TRANSMIT RESOURCE POOL FOR A PREDEFINED MODE CONFIGURED BY THE SERVING NODE IN A CASE WHERE BEING CONFIGURED AS A PREDEFINED MODE ~410

TRANSMIT SERVICE DATA BASED ON THE TARGET RESOURCE ~420

FIG. 9

CONFIGURE, FOR A TERMINAL IN A PREDEFINED MODE, A TRANSMIT RESOURCE POOL FOR THE PREDEFINED MODE ~510

CONFIGURE A FEEDBACK RESOURCE OF AT LEAST ONE RESOURCE POOL IN THE TRANSMIT RESOURCE POOL FOR THE PREDEFINED MODE ~520

FIG. 10

METHOD OF RESOURCE ACQUISITION, METHOD OF RESOURCE SCHEDULING, TERMINAL, SERVICE NODE, AND MEDIUM

CROSS-REFERENCE TO RELATED APPLICATION

This application is a U.S. National Stage Application filed under 35 U.S.C. 371 based on International Patent Application No. PCT/CN2021/097163, filed May 31, 2021, which claims priority to CN patent application Ser. No. 202010254879.8, filed with the Chinese Patent Office on Apr. 2, 2020, the disclosures of each of which are incorporated herein by reference in their entireties.

FIELD

The present application relates to wireless communication networks, for example, to a method of resource acquisition method and method of resource scheduling, terminal, serving node and medium.

BACKGROUND

In vehicle to X (V2X) based on Long Term Evolution (LTE), a communication method based on cut-through/sidelink link between user equipment (UE) is one of ways to implement the V2X standard, and service data does not need to be forwarded by a serving node (such as a base station) and a core network and can be directly transmitted from source user equipment to target user equipment through an air interface. There are two modes for resource scheduling at a V2X terminal. The first mode is that, when a terminal needs communications, it needs to request to acquire a resource from a serving node, and the serving node allocates an appropriate resource for the terminal for data transmission. In this mode, in a case where the terminal is outside the range of the serving node or the connection with the serving node is unstable or even interrupted, the terminal cannot request to acquire a source from the serving node. As a result, data transmission fails. The second mode is that, a terminal senses in a resource pool by itself and selects a resource for data transmission. In this mode, the terminal only considers its own needs and cannot be scheduled uniformly, resulting in unreasonable resource allocation and low utilization. Therefore, the reliability and flexibility of resource scheduling are low.

SUMMARY

The present application provides a method of resource acquisition and method of resource scheduling, terminal, serving node and medium to improve the reliability and flexibility of resource scheduling.

Embodiments of the present application provide a method of resource acquisition applied at a first terminal, the method includes: receiving configuration information, transmitted by a second terminal, of an available resource set in a case where a predefined condition is satisfied; and acquiring, based on the configuration information of the available resource set, a target resource for transmitting service data.

Embodiments of the present application further provide a method of resource scheduling applied at the second terminal, the method includes: configuring an available resource set of a first terminal in a case where a predefined condition is satisfied, the available resource set including a target resource for transmitting service data; and transmitting configuration information of the available resource set to the first terminal.

Embodiments of the present application further provide a method of resource scheduling applied at a serving node, the method includes: receiving request information from a second terminal in a case where a predefined condition is satisfied; and allocating an available resource set of a first terminal based on the request information, the available resource set including a target resource for transmitting service data.

Embodiments of the present application further provide a method of resource acquisition applied at a terminal, including: determining a target resource pool and a target resource from a transmit resource pool for a predefined mode configured by a serving node; transmitting service data based on the target resource.

Embodiments of the present application further provide a method of resource scheduling applied at a serving node, including: configuring, for a terminal in a predefined mode, a transmit resource pool for the predefined mode; and configuring a feedback resource of at least one resource pool in the transmit resource pool for the predefined mode.

Embodiments of the present application further provide a terminal, including: one or more processors; a storage for storing one or more programs; when executed by the one or more processors, causing the one or more processors to implement the above-mentioned method of resource acquisition applied at the first terminal or applied at the terminal or the method of resource scheduling applied at the second terminal.

The embodiment of the present application further provides a serving node, including: one or more processors; a storage for storing one or more programs; when executed by the one or more processors, causing the one or more processors to implement the above-mentioned method of resource scheduling applied at a serving node.

Embodiments of the present application further provide a computer-readable storage medium including computer program stored thereon, when executed by a processor, implementing the above-mentioned method of resource acquisition or method of resource scheduling.

BRIEF DESCRIPTION OF THE DRAWINGS

FIG. 7 is a flowchart of a method of resource scheduling applied at a second terminal according to an embodiment of the present application;

FIG. 8 is a flowchart of a method of resource scheduling applied at a serving node according to an embodiment of the present application;

FIG. 9 is a flowchart of a method of resource acquisition applied at a terminal according to an embodiment of the present application;

FIG. 10 is a flowchart of a method of resource scheduling applied at a serving node according to an embodiment of the present application;

DETAILED DESCRIPTION OF EMBODIMENTS

The present application will be described in detail below with reference to drawings and embodiments.

The Internet of Vehicles refers to a network for wireless communication and information exchange between vehicles, pedestrians, road equipment and the Internet in accordance with agreed communication protocols and data interaction standards. In V2X technology of the Internet of Vehicles, service data can be directly transmitted from a source UE to the target UE through an air interface without being forwarded by a serving node (such as the base station) and a core network. In the V2X scenario, the UE has two modes: a mode of serving node-control based (mode 1) and a mode of self-scheduling resource (mode 2). In mode 1, when UE needs communications, it needs to make a source request to a base station, and the base station allocates an appropriate resource for the UE for data transmission. In mode 2, the UE may sense in a resource pool and selects a resource for data transmission by itself. in a case where the UE is outside coverage of the base station or a connection with the base station is unstable or even interrupted, the UE cannot request to the base station to allocate resources with mode 1. Scheduling resources cannot be unified in a case where the UE uses mode 2, resulting in unreasonable resource allocation and low utilization. Therefore, the reliability and flexibility of resource scheduling are low.

In this embodiment of the present application, a method of resource acquisition is provided. a first terminal can accept assisted scheduling of a second terminal in a case where a predefined condition is satisfied, and acquire a target resource based on an available resource set configured by the second terminal without depending on direct scheduling of a serving node, and realize rational use of network resources with the assistance of the second terminal, thereby improving reliability and flexibility of resource scheduling.

Figure 1:
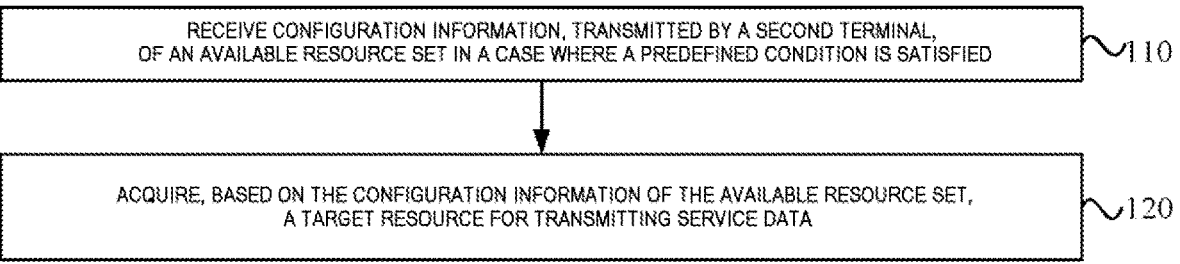
FIG. 1 is a flowchart of a resource acquisition method applied at a first terminal according to an embodiment of the present application.

FIG. 1 is a flowchart of a method of resource acquisition applied at a first terminal according to an embodiment. As shown in FIG. 1, the method provided in this embodiment includes S110 and S120.

In S110, configuration information, transmitted by a second terminal, of an available resource set is received in a case where a predefined condition is satisfied.

In S120, based on the configuration information of the available resource set, a target resource for transmitting service data is acquired.

In this embodiment, in a case where the predefined condition is satisfied, the first terminal may enable the resource acquisition method that the assisted by the second terminal in scheduling, or may request the second terminal to perform assisted scheduling. On this basis, a terminal accepts the assisted scheduling of the second terminal, and may determine the target resource in the configured available resource set by receiving configuration information of the available resource set transmitted by the second terminal, and use the target resource to transmit service data. Where the predefined condition may be that the first terminal is capable of being assisted scheduling by other terminals and the second terminal is capable of assisting in scheduling other terminals, and whether is capable of being assisted scheduling or assisting in scheduling may also be determined based on coverage of a serving node, congestion level of a resource pool, the number of terminals to be assisted scheduling, connection stability and communication quality of the first terminal and the second terminal.

If the predefined condition is satisfied, the first terminal may acquire the target resource based on the second terminal-assisted scheduling, and directly interact with the second terminal without via the serving node. In the process of assisting in scheduling the first terminal, the second terminal may sense the available resource set by itself, and indicate corresponding configuration information to the first terminal, or may generate corresponding configure information for the available resource set allocated by the first terminal according to the serving node and indicate the corresponding configure information to the first terminal. On this basis, the first terminal acquires a target resource without depending on the scheduling of the serving node, and may reasonably use network resources with the assistance of the second terminal, thereby improving the reliability and flexibility of resource scheduling.

In an embodiment, a predefined condition includes the following: a direct communication PC5 radio resource control (RRC) unicast connection with a second terminal has been established.

In this embodiment, in a case where a PC5-RRC unicast connection is established between the first terminal and the second terminal, the first terminal may enable the resource acquisition method that the second terminal assists in scheduling, or may request the second terminal to assist in scheduling it, so that acquiring the target resource from the available resource set based on assisted scheduling of the second terminal.

In an embodiment, a predefined condition includes the following: first capability information reported by the second terminal is received; where the first capability information includes at least one of the following: information on a capability of the second terminal to assist the first terminal to sense an optional resource set, information on a capability of the second terminal to assist the first terminal to sense an optional resource in the optional resource set, and information on a capability of the second terminal to provide the available resource set for the first terminal.

In this embodiment, the second terminal may report the first capability information to the first terminal, for example, reporting that the second terminal is capable of assisting the first terminal in sensing the available resource set, or reporting that the second terminal is capable of assisting the first terminal in sensing a resource which can be used as the target source in the optional resource set, or reporting that the second terminal is capable of providing or configuring an available resource set for the first terminal, etc. in a case where the first terminal receives the first capability information reported by the second terminal, the first terminal may enable the resource acquisition method that the second terminal assists in scheduling, or may request the second terminal to assist in scheduling it, so that the target resource is acquired from the available resource set according to assisted acquiring a target resource from the available resource set based on the assisted scheduling of the second terminal.

In an embodiment, a predefined condition includes the following: reporting second capability information to the second terminal, where the second capability information includes information on a capability of the first terminal to accept assisted scheduling.

In this embodiment, the first terminal may report the second capability information to the second terminal, and the first terminal may report that the first terminal is capable of being assisted scheduling to the second terminal, to indicate that it can receive the configuration information of the available resource set of the second terminal, and acquire the target resource with the assistance of the second terminal. in a case where the first terminal reports the second capability information to the second terminal, the first terminal may enable the resource acquisition method that the second terminal assists in scheduling, or may request the second terminal to assist in scheduling it, so that the target resource is acquired from the available resource set based on assisted scheduling of the second terminal.

In an embodiment, a predefined condition includes at least one of the following: a second terminal is within coverage of a serving node and a first terminal is outside coverage of a serving node; a measurement value of a congestion level of a resource pool is higher or lower than a congestion level threshold, where the congestion level threshold is configured by the second terminal or a serving node; and a measurement value of reference signal received power (RSRP) is higher or lower than an RSRP measurement threshold, where the RSRP measurement threshold is configured by the second terminal or a serving node.

In this embodiment, the first terminal and the second terminal interact with their own coverage. in a case where a second terminal is within coverage of a serving node and a first terminal is outside coverage of a serving node, the first terminal acquires the target source without scheduling of the serving node, and the first terminal may enable the resource acquisition method that the second terminal assists in scheduling, or may request the second terminal to assist in scheduling for it, so that the target resource is acquired from the available resource set based on assisted scheduling of the second terminal. in a case where a measurement value of a congestion level of a resource pool or a measurement value of RSRP is higher, the first terminal may enable the resource acquisition method that the second terminal assists in scheduling, or may request the second terminal to assist in scheduling for it, so that the target resource is acquired from the available resource set based on assisted scheduling of the second terminal. The threshold of congestion level or the measurement value of RSRP is configured by the second terminal or the serving node, or may be predefined.

In an embodiment, a predefined condition includes at least one of the following: the number of terminals scheduled by the second terminal is less than a maximum number of scheduled terminals, the number of remaining terminals schedulable by the second terminal is greater than 0, and a Boolean value indicated by the second terminal is a predefined value, where the Boolean value is used to indicate whether the second terminal is capable of scheduling the first terminal.

In this embodiment, the second terminal may establish a unicast connection with multiple different UEs at the same time, and may also need to assist different UEs for resource scheduling at the same time. Considering the limitation of the assisted scheduling capability of the second terminal, the serving node may configure the maximum number of scheduling terminals for the second terminal. The second terminal can report the number of scheduled terminals and the maximum number of scheduled terminals to the first terminal. in a case where the number of scheduled terminals is less than the maximum number of scheduled terminals, the first terminal may enable or request the second terminal to assist in scheduling for it. In some embodiments, the second terminal may also report the number of remaining terminals schedulable to the first terminal, where the number of remaining terminals schedulable is the difference between the maximum number of scheduled terminals and the number of scheduled terminals, and in a case where the number of remaining terminals schedulable is greater than 0, the first terminal may enable or request the second terminal to assist in scheduling for it. In some embodiments, the second terminal may further indicate to the first terminal the Boolean value indicating whether the second terminal is capable of assisting in scheduling the first terminal. For example, the value of 1 of the Boolean value indicates that the second terminal may assist in scheduling the first terminal. The value of 0 of the Boolean value indicates that the second terminal cannot assist in scheduling the first terminal due to its own capability, the first terminal may enable or request the second terminal to assist in scheduling for it based on the indication of the Boolean value in a case where the Boolean value is a predefined value (for example, 1).

Through the above predefined conditions, it can be determined whether assisted scheduling can be implemented smoothly, and the stability and reliability of the assisted scheduling execution process can be ensured.

In an embodiment, the resource acquisition method further includes the following:

S101: first signaling indicating the second terminal is transmitted to configure an available resource set of the first terminal. The first signaling includes at least one of the following: PC5-RRC signaling; side link medium access control (MAC) signaling; side link control information (SCI).

In this embodiment, in a case where the predefined condition is not satisfied, the first terminal may accept the assisted scheduling of the second terminal, and the first terminal can indicate the second terminal to configure the available resource set by transmitting the first signaling. On this basis, the first terminal may receive the configuration information of the available resource set transmitted by the second terminal, and acquire the target resource with the assistance of the second terminal.

In an embodiment, the resource acquisition method further includes the following:

S102: the second terminal is requested to configure an available resource set of the first terminal through second signaling in a case where the predefined condition is not satisfied, where the second signaling includes at least one of the following: PC5-RRC signaling; side link MAC signaling; and SCI.

In this embodiment, in a case where the predefined condition is not satisfied, the first terminal may not voluntarily enable the resource acquisition method that the second terminal assist in scheduling, and cannot be scheduling assisted by the second terminal directly, but the first terminal may request the second terminal to configure the available resource set through second signaling to improve the flexibility of resource acquisition.

In an embodiment, an available resource set is allocated to a first terminal by a serving node in response to request information from a second terminal. The request information includes at least one of the following: a destination identifier, ID, of a current service of the first terminal and resource request indication; a destination ID of the first terminal and resource request indication, resource request indication, where, the resource request indication includes at least one of the following information: a service priority; and a buffer size for a service packet.

In this embodiment, in a case where the first terminal is enabled or switched to the resource acquisition method that the second terminal assists in scheduling, the second terminal may report request information to the serving node to request the serving node allocate an available resource set for the first terminal, where the request information may include a Destination ID of current service of the first terminal, the destination ID of the first terminal and/or resource request indication, and may also include the destination ID corresponding to the second terminal, and the like. After receiving the request information, the serving node can allocate the available resource set of the first terminal accordingly, allocate appropriate resources according to the service priority and a buffer size for the service packet, etc., for transmitting the current service data of the first terminal, and notifying the second terminal through the RRC signaling such that the second terminal transmits the configuration information of the available resource set to the first terminal, and assists the first terminal to acquire the target resource from the available resource set.

In an embodiment, the resource acquisition method further includes the following:

S103: service attribute information is reported to the second terminal through third signaling. The service attribute information includes at least one of the following: a service latency requirement; the number of service sub-channels; a service cycle duration; and hybrid automatic repeat request (HARQ) feedback configuration information.

In this embodiment, in a case where the predefined condition is not satisfied, the first terminal may accept assisted scheduling of the second terminal, then the first terminal may report service attribute information to a second terminal through third signaling, and the second terminal configures an appropriate available resource set for the first terminal based on the service attribute information. For example, in a case where the first terminal has higher requirements for service latency and requires a larger number of service sub-channels, the available resource set configured by the second terminal has lower latency for data transmission and includes more service sub-channels, etc. On this basis, after acquiring a service attribute parameter, the second terminal may transmit the configuration information of the available resource set to the first terminal through PC5-RRC signaling, side link MAC signaling or SCI, such that the first terminal acquires the target resource under the assistance of the second terminal.

In an embodiment, S110 includes the following:

Configuration information of the available resource set is received through PC5-RRC signaling or side link MAC signaling or SCI. the available resource set is sensed by the second terminal or allocated by a serving node.

In this embodiment, in a case where the predefined condition is not satisfied, the first terminal may accept assisted scheduling of the second terminal, the second terminal may sense the available resource set by itself or acquire the available resource set through the configuration of the base station, and notify the first terminal of the configuration information of the available resource set through the PC5-RRC signaling or the side link MAC signaling or the SCI. The first terminal acquires the target resource under the assistance of the second terminal.

In an embodiment, S120 includes the following:

Acquiring a target resource is requested by transmitting a resource request indication of a PC5 interface to the second terminal; or the target resource is sensed in the available resource set based on the available resource set sensed and configured by the second terminal.

In this embodiment, the first terminal may transmit a resource request indication of a PC5 interface to the second terminal to request to use the target resource, or the first terminal may also acquire the target resource in the available resource set by means of autonomously sensing.

In an embodiment, the method further includes the following:

S104: resource pool configuration information is reported to the second terminal through fourth signaling; the target resource is sensed by the second terminal in the available resource set according to the resource pool configuration information; S120, including the following: acquiring the target resource is requested by transmitting the resource request indication of the PC5 interface to the second terminal.

In this embodiment, in a case where the predefined condition is not satisfied, the first terminal may accept assisted scheduling of the second terminal, and the first terminal may report resource pool configuration information to the second terminal through fourth signaling, and the second terminal configures a suitable available resource set for the first terminal based on the resource pool configuration information. On this basis, the second terminal may transmit the configuration information of the available resource set to the first terminal through the PC5-RRC signaling, the side link MAC signaling or the SCI after acquiring the resource pool configuration information, the first terminal acquires the target resource under the assistance of the second terminal. In addition, the first terminal may transmit the resource request indication of the PC5 interface to the second terminal to request to use the target source.

By indicating or requesting the second terminal to configure the available resource set of the first terminal, flexibility of resource scheduling is improved; by reporting service attribute information and/or resource pool configuration information to the second terminal, a basis for the second terminal to configure the available resource set is provided, and the reliability of the second terminal to assist in scheduling resource is improved.

In an embodiment, the method further includes the following:

S100: a PC5-RRC unicast connection with the second terminal is established based on a terminal identifier; or, a PC5-RRC unicast connection with the second terminal is established based on a service identifier.

It is possible that multiple PC5-RRC or PC5-S connections are simultaneously established between a first terminal and a second terminal. In this embodiment, the first terminal and the second terminal identify a peer UE through interacting terminal identifier (UE-ID) during each process of establishing a PCR-RRC connection, and confirm that the established PCR-RRC connections are all correspond to the same peer UE so as to avoid enable the resource acquisition method that each unicast connection needs enable assisted scheduling when the peer UE cannot be identified, and to avoid scheduling latency and signaling overhead resulted from repeated execution of the operations in the above embodiment, and to avoid resource waste caused by the second terminal reserving multiple available resource sets for the peer UE of each unicast connection.

In some embodiments, whenever a first terminal establishes a new PC5-RRC connection with a second terminal, the second terminal may maintain a destination ID list for unicast connection with the first terminal, and may report the destination ID list to a serving node after each update, so as to ensure identifiability of each unicast connection and facilitate flexible management. Correspondingly, in a case where the serving node needs to update a resource pool configuration between the first terminal and the second terminal, all destination IDs in the destination ID list may be updated.

In an embodiment, the method further includes the following:

S130: in a case where a target resource conflicting with a non-target resource, service data corresponding to a first priority is transmitted. The first priority is a higher one of the priority of the target resource and a priority of the non-target resource. The non-target resource is allocated by a serving node or sensed by the first terminal.

The transmitting the service data corresponding to the first priority, including: a MAC PDU corresponding to the target resource is transmitted in a case where a priority of a highest priority logical channel of a MAC protocol data unit PDU corresponding to the target resource is higher than a priority of a highest priority logical channel of a MAC PDU corresponding to the non-target resource.

In this embodiment, for the unicast service with the second terminal, the first terminal may acquire the target resource through the approach of assisted scheduling of the second terminal. Meanwhile, the first terminal may also have other broadcast communication services. For the communication service, the first terminal may acquire resources from the serving node by means of mode 1, or autonomously acquiring resources (i. e. non-target resources) by means of mode 2. In this case, the target resource acquired by the second terminal assisting the first terminal may conflict with the non-target resource in a time-frequency domain, resulting in service failure. In this embodiment, by comparing priorities, the first terminal abandons data transmission on a destination ID, and transmits service data corresponding to the first priority, thereby improving reliability of data transmission.

If a priority of a highest priority logical channel of a transmission MAC PDU corresponding to the target resource that the second terminal assists in scheduling is higher than logical channel priority of the highest priority of a transmission MAC PDU corresponding to the non-target resource scheduled by a serving node or autonomously sensing by the first terminal, a transmission MAC PDU corresponding to the target resource is transmitted first; and vise, a transmission MAC PDU corresponding to the non-target resource is transmitted first.

Figure 2:
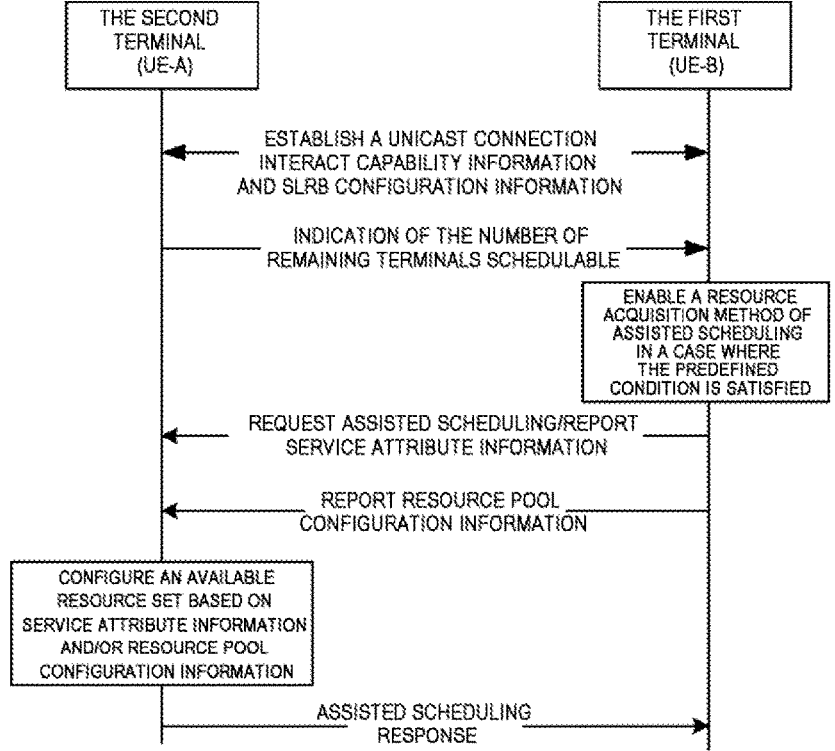
FIG. 2 is a schematic diagram of interaction between a first terminal and a second terminal according to an embodiment of the present application.

FIG. 2 is a schematic diagram of interaction between a first terminal and a second terminal according to an embodiment. As shown in FIG. 2, there is a unicast communication service between the first terminal (denoted as UE-B) and the second terminal (denoted as UE-A), and the UE-A may directly assist in scheduling the UE-B without scheduling intervention or grant of the serving node. First, the UE-B establishes a PC5-RRC unicast connection, interacts capability information (including the first capability information and/or the second capability information in the above-mentioned embodiment), and also interacts side link radio bearers (SLRB) configuration information with the UE-A. In an example, the UE-A indicates the number of remaining terminals schedulable to the UE-B. in a case where the predefined condition is satisfied, the UE-B enables a resource acquisition method for assisted scheduling. The UE-B may transmit the UE-A the first signaling to request or indicate the UE-A to configure the available resource set, also transmit the third signaling to report the service attribute information, and also transmit the fourth signaling to report the resource pool configuration information for the UE-A configures the available resource set of unicast service, and return the configuration information to the UE-B to complete an assisted scheduling response. On this basis, the UE-B may acquire the target resource with assistance of the UE-A.

Figure 3:
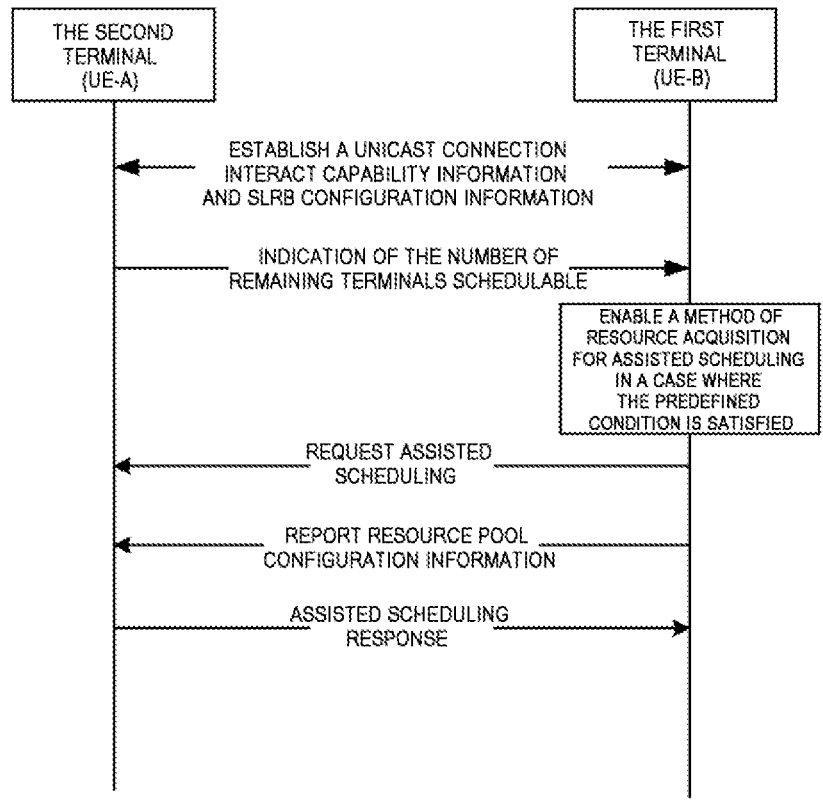
FIG. 3 is a schematic diagram of interaction between a first terminal and a second terminal according to another embodiment of the present application.

FIG. 3 is a schematic diagram of interaction between a first terminal and a second terminal according to another embodiment. As shown in FIG. 3, there is a unicast communication service between the first terminal (denoted as UE-B) and the second terminal (denoted as UE-A), and the UE-A may directly assist in scheduling the UE-B without scheduling intervention or grant of the base station. First, the UE-B establishes a PC5-RRC unicast connection, interacts capability information (including the first capability information and/or the second capability information in the above-mentioned embodiment), and also interacts SLRB configuration information with the UE-A. In an example, the UE-A indicates the number of remaining terminals schedulable to the UE-B. in a case where the predefined condition is satisfied, the UE-B enables a resource acquisition method for assisted scheduling. The UE-B may transmit the UE-A the first signaling to request or indicate the UE-A to configure the available resource set, also transmit the resource pool configuration information to the UE-A through the fourth signaling. The UE-A senses in the resource pool configured by the UE-B based on the resource pool configuration information of the UE-B. The UE-A may select the available resource set of the unicast service and transmit configuration information to the UE-B to complete the response of assisted scheduling.

Figure 4:
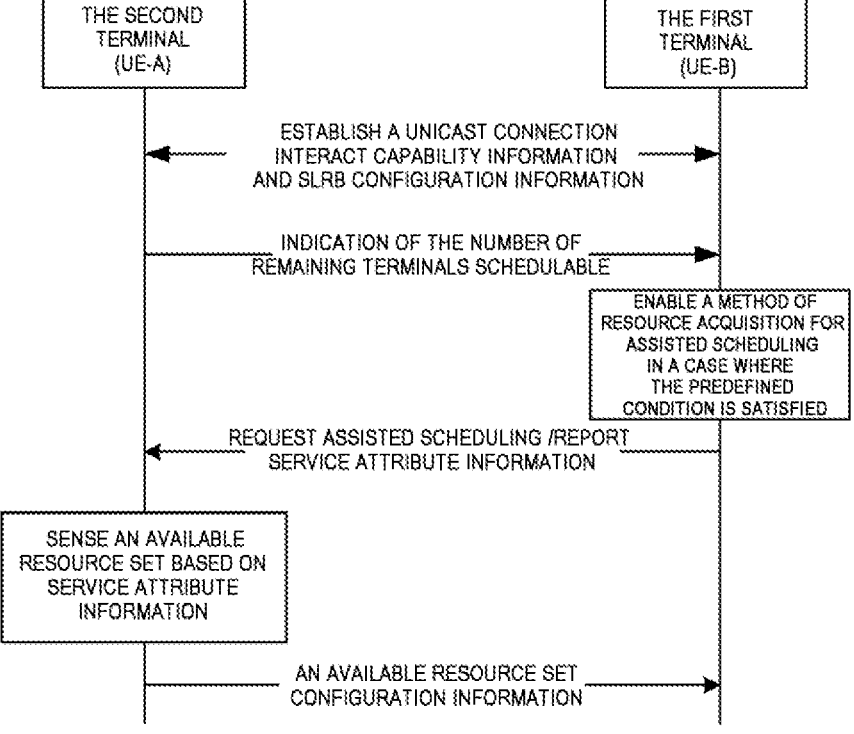
FIG. 4 is a schematic diagram of interaction between a first terminal and a second terminal according to yet another embodiment of the present application.

FIG. 4 is a schematic diagram of interaction between a first terminal and a second terminal according to yet another embodiment. As shown in FIG. 4, there is a unicast communication service between the first terminal (denoted as UE-B) and the second terminal (denoted as UE-A), and the second terminal may directly assist in scheduling the first terminal without scheduling intervention or grant of the base station. First, the UE-B establishes a PC5-RRC unicast connection, interact capability information (including the first capability information and/or the second capability information in the above-mentioned embodiment), and also interacts SLRB configuration information with the UE-A. In an example, the UE-A indicates the number of remaining terminals schedulable to the UE-B. in a case where the predefined condition is satisfied, the UE-B enables a resource acquisition method for assisted scheduling. The UE-B may transmit the first signaling to the UE-A to request or indicate the UE-A to configure the available resource set, also transmit it's own service attribute information to the UE-A through third signaling, and the UE-A senses based on the service attribute information of the UE-B, and selects the available resource set of the unicast service, and transmits configuration information to the UE-B.

Figure 5:
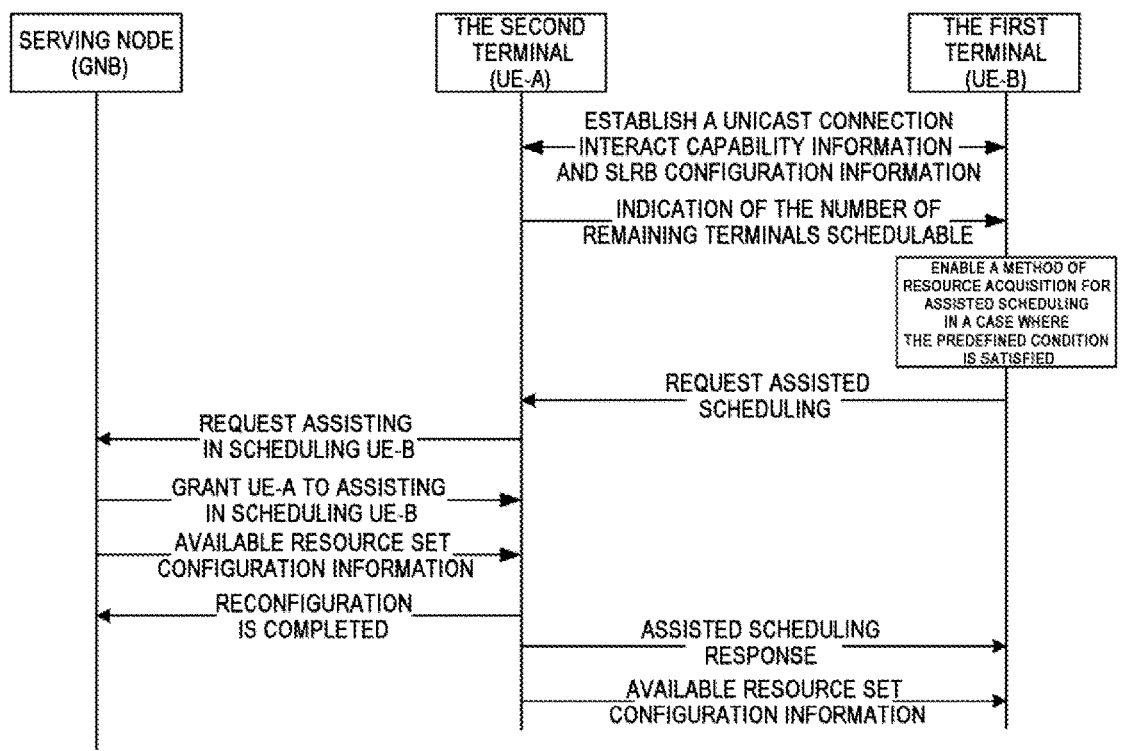
FIG. 5 is a schematic diagram of interaction between a first terminal, a second terminal, and a serving node according to an embodiment of the present application.

FIG. 5 is a schematic diagram of interaction between a first terminal, a second terminal, and a serving node according to an embodiment. As shown in FIG. 5, there is a unicast communication service between the first terminal (denoted as UE-B) and the second terminal (denoted as UE-A), and the first terminal can be assisted in scheduling after scheduling intervention or grant of the serving node. First, the UE-B establishes a PC5-RRC unicast connection, interacts capability information (including the first capability information and/or the second capability information in the above-mentioned embodiment), and also interacts SLRB configuration information with the UE-A. In an example, the UE-A indicates the number of remaining terminals scheduulable to the UE-B. in a case where the predefined condition is satisfied, the UE-B enables a resource acquisition method for assisted scheduling. The UE-B may transmit the first signaling to the UE-A to request or indicate the UE-A to configure the available resource set. The UE-A transmits request information to the serving node to request the serving node to grant the UE-A to assist in scheduling UE-B. The serving node transmits the grant information to the UE-A, and may transmit the configuration information of the available resource set allocated for the UE-B to the UE-A. After the reconfiguration is completed, the UE-A may respond to the assisted scheduling request of the UE-B based on the resource pool configuration of the unicast service transmitted by the serving node and forward the configuration information of the available resource set to the UE-B.

In an embodiment, the method further includes the following:

S105: configuration information of a non-target resource allocated by a serving node or sensed by the first terminal is transmitted to the second terminal.

In this embodiment, the first terminal may transmit the configuration information of the non-target resource used for transmitting other service data to the second terminal, and the second terminal may accordingly avoid the non-target resource in the time domain in the process of sensing the available resource set so as to avoid conflict of the target resource and the non-target resource, and improving the reliability of resource scheduling.

In an embodiment, the method further includes the following:

S140: in a case where a PC5-RRC unicast connection with the second terminal has been established, a unicast connection with a third terminal has been established, and the first terminal is not capable of assisting in scheduling the third terminal, an assisted scheduling request to the second terminal is transmitted. The assisted scheduling request includes a terminal identifier of the third terminal;

S150: resource pool configuration forwarded by the second terminal is received. The resource pool configuration is transmitted to the second terminal by a serving node;

S160: the resource pool configuration is indicated to the third terminal, and assisted scheduling inquiry information is transmitted to the third terminal.

In this embodiment, the first terminal may request the second terminal to assist in scheduling the third terminal, and the second terminal forwards the resource pool configuration transmitted by the serving node to the first terminal. The first terminal forwards the resource pool configuration to the third terminal and inquires whether the third terminal accepts the assisted scheduling of the second terminal, in a case where yes, the second terminal may schedule the first terminal and the third terminal.

Figure 6:
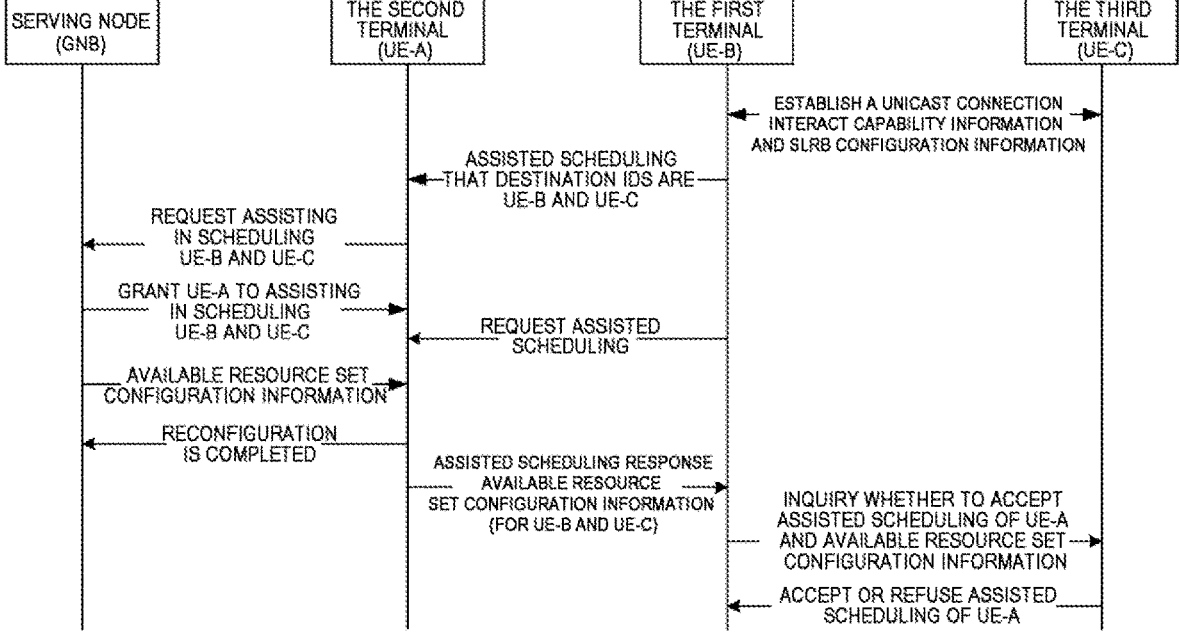
FIG. 6 is a schematic diagram of interaction between a first terminal, a second terminal, and a serving node according to another embodiment of the present application.

FIG. 6 is a schematic diagram of interaction between a first terminal, a second terminal, and a serving node according to another embodiment.

As shown in FIG. 6, there is no unicast communication service between the first terminal (denoted as UE-B) and the second terminal (denoted as UE-A), and the UE-A may directly schedule the UE-B and UE-C after intervention or grant of the serving node. First, the first terminal transmits a unicast connection establishing flow and establishes a PC5-RRC unicast connection with the third terminal. in a case where neither the second terminal nor the third terminal is capable of assisting in scheduling other UEs, and the first terminal has an unreleased unicast connection with other UEs (i.e. UE-A) having the assisted scheduling capability, then the first terminal may transmit an assisted scheduling request to the second terminal and carry terminal identifier (UE-ID) information of the third terminal. The second terminal may apply to the serving node for granting to schedule the UE-B and the UE-C. in a case where the serving node allows grant, the resource pool configuration may be transmitted to the UE-A, and then the UE-A forwards the resource pool configuration to the UE-B, and the UE-B may also indicate the resource pool configuration to the UE-C and inquiry whether the UE-C needs to accept assisted scheduling of the UE-A, such that the UE-A may schedule the available resource of the UE-B and the UE-C at the same time. The scheduling of the UE-C does not depend on the serving node and there is no requirement of establishing a unicast connection between the UE-C and the UE-A, which improves the flexibility of resource scheduling.

In the embodiment of the present application, a resource scheduling method applied at a second terminal is further provided. in a case where a predefined condition is satisfied, the second terminal may assist in scheduling the first terminal, and configure an available resource set for the first terminal, thereby improving the reliability and flexibility of resource scheduling. In the following embodiments, operations performed by the second terminal correspond to operations performed by the first terminal in the foregoing embodiments, and details not described in detail in this embodiment may refer to any of the foregoing embodiments.

FIG. 7 is a flowchart of a resource scheduling method applied at a second terminal according to an embodiment. As shown in FIG. 7, the method provided by this embodiment includes S210 and S220.

In S210, in a case where a predefined condition is satisfied, an available resource set of a first terminal is configured, where the available resource set includes a target resource for transmitting service data.

In S220, configuration information of the available resource set is transmitted to the first terminal.

In this embodiment, in a case where a predefined condition is satisfied, the second terminal may assist in scheduling the first terminal, and configure an available resource set for the first terminal. On this basis, the first terminal accepts the assisted scheduling of the second terminal, and by receiving configuration information of the available resource set transmitted by the second terminal, the first terminal may use the target resource to transmit service data in the configured available resource set. The predefined condition may be that the first terminal is capable of being assisted in scheduling by other terminals and the second terminal is capable of assisting in scheduling other terminals, and whether is capable of being assisted in scheduling or assisting in scheduling may also be determined based on coverage of a serving node, congestion level of a resource pool, the number of terminals being assisted scheduling, connection stability and communication quality of the first terminal and the second terminal.

In an embodiment, the available resource set is configured by a serving node or sensed by the second terminal.

If the predefined condition is satisfied, the second terminal may help the first terminal to acquire the target resource based on assisted scheduling. In the process of assisting in scheduling the first terminal, the second terminal may sense the available resource set by itself, and indicate corresponding configuration information to the first terminal, and may also generate corresponding configure information based on the available resource set allocated by the serving node for the first terminal and indicate the corresponding configure information to the first terminal. On this basis, the first terminal acquires a target resource without depending on scheduling of the serving node, and may reasonably use network resources with the assistance of the second terminal, thereby improving the reliability and flexibility of resource scheduling.

In an embodiment, a predefined condition includes the following: a PC5 RRC unicast connection with a first terminal has been established.

In an embodiment, a predefined condition includes the following: first capability information has been reported to a first terminal. The first capability information includes at least one of the following: information on a capability of the second terminal to assist the first terminal to sense an optional resource set; information on a capability of the second terminal to assist the first terminal to sense an optional resource in an available resource set; and information on a capability of the second terminal to provide an available resource set for the first terminal.

In an embodiment, a predefined condition includes the following: second capability information reported by the first terminal is received. The second capability information includes information on a capability of the first terminal to accept assisted scheduling.

In an embodiment, a predefined condition includes at least one of the following:

A second terminal is within coverage of a serving node and a first terminal is outside coverage of a serving node; a measurement value of congestion level of a resource pool is higher or lower than a congestion level threshold, where the congestion level threshold is configured by the second terminal or a serving node; and a measurement value of RSRP is higher or lower than a RSRP measurement threshold, where the RSRP measurement threshold is configured by the second terminal or a serving node.

In an embodiment, a predefined condition includes at least one of the following: the number of terminals scheduled by a second terminal is less than a maximum number of scheduled terminals; the number of remaining terminals schedulable by the second terminal is greater than 0; a Boolean value indicated by the second terminal is a predefined value, the Boolean value is used to indicate whether the second terminal is capable of scheduling the first terminal.

Through the above predefined conditions, it can be determined whether assisted scheduling can be successfully implemented, and the stability and reliability of assisted scheduling execution process can be ensured.

In an embodiment, the method further includes the following:

S201: first signaling is received, the first signaling is used to indicate the second terminal to configure an available resource set of the first terminal. The first signaling includes at least one of the following: PC5-RRC signaling; side link MAC signaling; SCI.

In an embodiment, the method further includes the following:

S202: second signaling is received. The second signaling is used to request the second terminal to configure an available resource set of the first terminal. The second signaling includes at least one of the following: PC5-RRC signaling; side link MAC signaling; SCI.

In an embodiment, S210 includes the following:

S211: request information is transmitted to a serving node;

S212: an available resource set allocated by the serving node to a first terminal is determined through RRC signaling. The request information includes at least one of the following: a destination ID of current service of the first terminal and a resource request indication; a destination ID of the first terminal and a resource request indication; a resource request indication. The resource request indication includes at least one of the following information: a service priority; and a buffer size for a service packet.

In an embodiment, S210 includes the following:

S213: service attribute information is received;

S214: an available resource set of the first terminal is configured based on the service attribute information. The service attribute information includes at least one of the following: a service latency requirement; the number of service sub-channels; a service cycle duration; HARQ feedback configuration information.

In an embodiment, S210 includes the following:

S215: configuration information of the available resource set is transmitted to the first terminal through PC5-RRC signaling or side link MAC signaling or SCI, the available resource set is sensed by the second terminal or allocated by a serving node.

In an embodiment, the method further includes the following:

S230: a resource request indication request of a PC5 interface of the first terminal is received and the target resource based on the resource request indication request is provided; or the available resource set is sensed.

In this embodiment, the second terminal may sense the available resource set, and transmit the configuration information of the available resource set to the first terminal, and the first terminal may sense and acquire the target resource on this basis.

In an embodiment, S210 includes the following:

S216: resource pool configuration information is received;

S217: an available resource set of the first terminal is configured based on the resource pool configuration information;

The method further includes the following:

S231: resource request indication request of a PC5 interface of the first terminal is received and the target resource based on the resource request indication request is provided.

By configuring the available resource set of the first terminal based on an indication or a request of the first terminal, flexibility of resource scheduling is improved; by receiving the service attribute information and/or the resource pool configuration information reported by the first terminal, the available resource set is configured accordingly, and thereby the reliability of assisted scheduling resources is improved.

In an embodiment, the method further includes the following:

S200: a PC5-RRC unicast connection with the first terminal is established based on a terminal identifier; or, a PC5-RRC unicast connection with the first terminal is established based on a service identifier.

In an embodiment, the method further includes the following:

S240: a destination ID list between the first terminal and the second terminal is maintained and the destination ID list is reported to a serving node.

In an embodiment, the method further includes the following:

S203: configuration information of a non-target resource is received, where the non-target resource is allocated by a serving node or sensed by the first terminal. The target resource sensed by the second terminal and the non-target resource do not overlapped in both a time domain and a frequency domain.

In this embodiment, the second terminal senses the available resource set based on the configuration information of the non-target resources, and may actively avoid the non-target resource in the time domain so as to avoid conflict between the target resource and the non-target resources, thereby improving the reliability of resource scheduling.

In an embodiment, the method further includes the following:

S250: in a case where a PC5-RRC unicast connection with the first terminal has been established, the first terminal establishes a unicast connection with the third terminal, and the first terminal is not capable of assisting in scheduling the third terminal, an assisted scheduling request transmitted by the first terminal is received, where the assisted scheduling request includes a terminal identifier of the third terminal;

S260: resource pool configuration transmitted by a serving node is received and the resource pool configuration is forwarded to the first terminal.

In this embodiment, scheduling of the first terminal and the third terminal by the second terminal may be implemented, thereby flexibility of resource scheduling is improved.

In the embodiment of the present application, a resource scheduling method applied at a serving node is further provided. in a case where a predefined condition is satisfied, the serving node allocates the available resource set of the first terminal based on the request information of the second terminal and transmits the configuration information to the second terminal. The configuration information is forwarded by the second terminal so that the first terminal may acquire the target resource from the available resource set under assisted scheduling of the second terminal, thereby improving the reliability and flexibility of resource scheduling.

FIG. 8 is a flowchart of a method of resource scheduling applied at a serving node according to an embodiment. As shown in FIG. 8, the method provided by this embodiment includes S310 and S320.

In S310, in a case where a predefined condition is satisfied, request information of a second terminal is received.

In S320, an available resource set of a first terminal is allocated based on the request information, and the available resource set includes a target resource for transmitting service data.

In this embodiment, in a case where the predefined condition is satisfied, the first terminal may enable the resource acquisition method that scheduling assisted by the second terminal, or may request the second terminal to perform assisted scheduling. In the process of assisted scheduling of the first terminal, the second terminal transmits the request information to the serving node, and the serving node allocates the available resource set for the first terminal and generates corresponding configuration information, and the configuration information may be indicated by the second terminal to the first terminal. On this basis, the first terminal acquires the target resource without depending on scheduling of the serving node, and may reasonably use network resources with the assistance of the second terminal, thereby improving the reliability and flexibility of resource scheduling.

In an embodiment, the method further includes the following:

S301: a corresponding resource request mode is indicated to a first terminal.

The resource request mode includes at least one of the following: a resource request mode based on scheduling by a serving node; a resource acquisition mode based on autonomously sensing of the first terminal; a resource request mode based on second terminal scheduling.

In this embodiment, the serving node may indicate the resource request mode to the first terminal, and the resource request mode may include three types of modes: mode 1-based on scheduling by a serving node, mode 2-based on autonomously sensing by the first terminal, and mode 3-based on assisted scheduling by the second terminal. in a case where the first terminal is configured as mode 3, the first terminal and the second terminal may implement assisted scheduling and acquire the target resource through the resource acquisition method or resource scheduling method in any of the foregoing embodiments, and the serving node may also allocate the available resource set for the first terminal and forward the configuration information to the first terminal through the second terminal.

In an embodiment, a predefined condition includes the following: at least one of the second capability information reported by the first terminal and the first capability information reported by the second terminal is received; where the second capability information includes information on a capability of the first terminal to accept assisted scheduling; the first capability information includes at least one of the following: information on a capability of the second terminal to assist the first terminal to sense an available resource set; information on a capability of the second terminal to assist the first terminal to sense an available resource in an available resource set; and capability information that the second terminal provides an available resource set to the first terminal.

In an embodiment, a predefined condition includes at least one of the following:

The second terminal is within coverage of a serving node and the first terminal is outside coverage of a serving node; a measurement value of congestion level of a resource pool is higher or lower than a congestion level threshold, where the congestion level threshold is configured by the second terminal or configured by a serving node; a measurement value of RSRP is higher or lower than a RSRP measurement threshold, where the RSRP measurement threshold is configured by the second terminal or a serving node.

In an embodiment, a predefined condition includes at least one of the following: the number of terminals scheduled by a second terminal is less than a maximum number of scheduled terminals; the number of remaining terminals schedulable by the second terminal is greater than 0; and a Boolean value indicated by the second terminal is a predefined value, and the Boolean value is used to indicate whether the second terminal is capable of scheduling the first terminal.

In an embodiment, the request information includes at least one of the following:

A destination ID of current service of the first terminal and a resource request indication; a destination ID of the first terminal and a resource request indication; a resource request indication; where the resource request indication includes at least one of the following information: a service priority; and a buffer size for a service packet.

In an embodiment, the method further includes the following:

S330: a destination ID list of a unicast connection between a first terminal and a second terminal reported by the second terminal is received;

S340: a resource pool configuration of terminals with the same destination ID based on the destination ID list is updated.

In an embodiment, the method further includes the following:

S350: in a case where a PC5-RRC unicast connection between a first terminal and a second terminal has been established, a unicast connection between the first terminal and a third terminal has been established, and the first terminal is not capable of assisting in scheduling the third terminal, the terminal destination ID information to which the resource configuration is applicable applied at is indicated to the first terminal.

In this embodiment, the serving node allocates the available resource set and may indicate to the first terminal and the third terminal the terminal target ID information to which the resource configuration is applicable, so that the second terminal may simultaneously schedule the first terminal and the third terminal, thereby improving flexibility of the resource scheduling.

In the embodiment of the present application, a resource acquisition method applied at a terminal is further provided. The terminal may select a target resource pool and a target resource from a transmit resource pool configured by a serving node, and use the target resource to transmit service data, thereby flexibility and reliability of resource acquisition are improved. The terminal refers to a terminal configured as a predefined mode, and is not limited to the first terminal or the second terminal in the foregoing embodiment.

FIG. 9 is a flowchart of a resource acquisition method applied at a terminal according to an embodiment. As shown in FIG. 9, the method provided in this embodiment includes S410 and S420.

In S410, in a case where being configured as a predefined mode, the target resource pool and the target resource are determined from a predefined mode transmit resource pool configured by the serving node.

In S420, service data is transmitted based on the target resource.

In this embodiment, the serving node may configure multiple predefined mode (mode 2) transmit resource pools for the terminal. in a case where the terminal is configured as mode 2, one or more target resource pools may be selected from the configured multiple mode 2 transmit resource pools for service data transmission.

In an embodiment, S410 includes the following: at least one target resource pool configured with a feedback resource, or at least one target resource pool configured without a feedback resource is selected from a predefined mode transmit resource pool; a target resource is selected from the target resource pool.

In this embodiment, the terminal may select for itself at least a mode 2 resource pool configured with feedback resources (i.e., Physical Side link Feedback Channel, PSFCH), or may select for itself at least a mode 2 resource pool configured without feedback resources.

In an embodiment, the method further includes the following:

S430: a target resource pool and a target resource are reselected based on a HARQ feedback attribute of a currently assembled MAC PDU.

In this embodiment, the resource pool on each carrier has indication of the corresponding resource pool busyness and idleness, i.e., Channel Busy Rate (CBR) in the process of a carrier selection at the terminal. For each terminal, different PPPP-CBR (ProSe Per-Packet Priority, PPPP) thresholds will be configured for different data packet near-field communication priorities. Therefore, the terminal may decide whether a data packet of the current service can be transmitted using the resource pool by comparing the -busy-idle level of the current resource pool with the PPPP-CBR thresholds corresponding to different packet near-field communication priorities. in a case where not, the target resource pool and the target resource can be reselected based on HARQ feedback attributes thereby the resource is scheduled flexibly.

In an embodiment, S430 includes the following:

If a HARQ feedback attribute of the MAC PDU is feedback enabling, and a previously selected target resource is configured without a feedback resource, a target resource pool and a target resource are reselected based on the configuration of an SLRB corresponding to the current service.

A target resource pool and a target resource are reselected based on the configuration of an SLRB corresponding to the current service, including:

If the SLRB is configured with HARQ feedback enabling, a resource pool configured with a feedback resource is selected as a reselected target resource pool, and a target resource is reselected from the target resource pool. in a case where the SLRB is configured with HARQ feedback disenabling, a resource pool configured without a feedback resource is selected as a reselected target resource pool, and a target resource is reselected from the target resource pool.

In this embodiment, in the reselection process of the terminal, the reselection of the target resource and the target resource pool may be performed based on the HARQ feedback attribute (HARQ feedback enabling or disabling) of the currently assembled MAC PDU. in a case where the MAC PDU of the terminal is HARQ feedback enabling, and the side link resource previously selected by the terminal is configured without the feedback resource, the target resource reselection and target resource pool reselection will be triggered, and the transmit resource pool and the transmit resource carrying the feedback resources will be the reselected.

In an embodiment, the terminal may also perform reselection based on an SLRB configuration corresponding to the current service. in a case where a UE has an SLRB configured with HARQ feedback enabling, the UE needs to select a mode 2 transmit resource pool configured with a feedback resource; in a case where the UE does not have any SLRB configured with HARQ feedback enabling, the UE may select a mode 2 resource pool configured without a feedback resource.

In an embodiment, in a case where a terminal selects one or more target resource pools and/or target resources from a resource pool configured by a serving node to perform mode 2 service, the terminal reports the selection result of its own target resource pools and/or target resources to a serving node. The selected target resource pools and/or index numbers of the target resources may be reported to the serving node.

In the embodiment of the present application, a resource scheduling method applied at a serving node is further provided. The serving node configures a predefined mode transmit resource pool for the terminal in the predefined mode and configures the feedback resource for the terminal to select or reselect the target resource pool and the target resource, thereby improving flexibility and reliability of resource scheduling. In this embodiment, an operation performed by the serving node corresponds to an operation performed by the terminal in the foregoing embodiment, and details not described in detail in this embodiment, reference may be made to any of the foregoing embodiments.

FIG. 10 is a flowchart of a resource scheduling method applied at a serving node according to another embodiment. As shown in FIG. 10, the method provided by this embodiment includes S510 and S520.

In S510, a predefined mode transmits resource pool for a terminal in a predefined mode is configured.

In S520, a feedback resource of at least one resource pool in the predefined mode transmit resource pool is configured.

In an embodiment, the method also includes the following:

S530: a selection result reported by a terminal is received. The selection result may include the selected target resource pool and/or the index number of the target resource.

Figure 11:
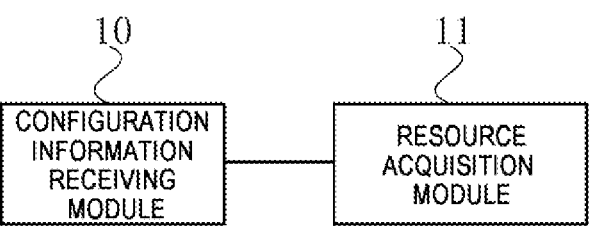
FIG. 11 is a schematic structural diagram of a resource acquisition apparatus according to an embodiment of the present application.

The embodiment of the present application further provides a resource acquisition apparatus. FIG. 11 is a schematic structural diagram of a resource acquisition apparatus according to an embodiment. As shown in FIG. 11, the resource acquiring apparatus includes the following: a configuration information receiving module 10 and a resource acquisition module 11.

The configuration information receiving module 10 is configured for receiving configuration information of an available resource set transmitted by a second terminal in a case where a predefined condition is satisfied; the resource acquisition module 11 is configured for acquiring a target resource based on configuration information of the available resource set, and the target resource is used for transmitting service data.

In this embodiment of the present application, a resource acquisition apparatus is provided. in a case where a predefined condition is satisfied, a first terminal may accept assisted scheduling of a second terminal, and acquire a target resource based on an available resource set configured by the second terminal without depending on scheduling of a serving node, and realize reasonable use of network resources with the assistance of the second terminal, thereby improving the reliability and flexibility of resource scheduling.

In an embodiment, the predefined condition includes the following: a direct communication radio resource control PC5-RRC unicast connection with the second terminal has been established.

In an embodiment, the predefined condition includes the following: the first capability information reported by the second terminal is received; where the first capability information includes at least one of the following: information on a capability of the second terminal to assist the first terminal to sense an optional resource set; information on a capability of the second terminal to assist the first terminal to sense an optional resource in an optional resource set; and information on a capability of the second terminal to provide the available resource set for the first terminal.

In an embodiment, the predefined condition includes the following: second capability information has been reported to the second terminal. The second capability information includes information on a capability of the first terminal accepting assisted scheduling.

In an embodiment, the predefined condition includes at least one of the following: the second terminal is within coverage of a serving node and the first terminal is outside coverage of a serving node; a measurement value of congestion level of a resource pool is higher or lower than a congestion level threshold, where the congestion level threshold is configured by the second terminal or configured by a serving node; and a measurement value of RSRP is higher or lower than a RSRP measurement threshold, where the RSRP measurement threshold is configured by the second terminal or configured by a serving node.

In an embodiment, the predefined condition includes at least one of the following: the number of terminals scheduled by the second terminal is less than a maximum number of scheduled terminals; the number of remaining terminals schedulable by the second terminal is greater than 0; and a Boolean value indicated by the second terminal is a predefined value, and the Boolean value is used to indicate whether the second terminal is capable of scheduling the first terminal.

In an embodiment, the apparatus further includes the following: first signaling transmitting module configured for transmitting first signaling where the first signaling is used to indicate the second terminal to configure an available resource set of the first terminal. The first signaling includes at least one of the following: PC5-RRC signaling; side link medium access control MAC signaling; side link control information SCI.

In an embodiment, the apparatus further includes the following: a second signaling transmitting module configured for requesting the second terminal to configure an available resource set of the first terminal through second signaling in a case where the predefined condition is not satisfied. Where The second signaling includes at least one of the following: PC5-RRC signaling; side link MAC signaling; side link control information SCI.

In an embodiment, the available resource set is allocated to the first terminal by a serving node based on request information of the second terminal. In an embodiment, the request information includes at least one of the following: a destination ID of current service of the first terminal and a resource request indication; a destination ID of the first terminal and a resource request indication; a resource request indication; where the resource request indication includes at least one of the following information: a service priority; and a buffer size for a service packet.

In an embodiment, the apparatus further includes the following: a reporting module configured for reporting service attribute information to the second terminal through third signaling; where the service attribute information includes at least one of the following: a service latency requirement; the number of service sub-channels; a service cycle duration; HARQ feedback configuration information.

In an embodiment, a configuration information receiving module 10 is configured for receiving configuration information of the available resource set through PC5-RRC signaling or side link MAC signaling or SCI. The available resource set is sensed by the second terminal or allocated by a serving node.

In an embodiment, a resource acquisition module 11 is configured to request to acquire a target resource by transmitting resource request indication request of a PC5 interface to the second terminal; or sense the target resource in the available resource set based on an available resource set sensed and configured by the second terminal.

In an embodiment, the apparatus further includes the following: a fourth signaling transmitting module configured to report resource pool configuration information to the second terminal through fourth signaling; the target resource is sensed by the second terminal in the available resource set based on the resource pool configuration information; a resource acquisition module 11 configured to request to acquire the target resource by transmitting the resource request indication request of the PC5 interface to the second terminal.

In an embodiment, the apparatus further includes the following: a unicast connection establishing module configured to establish a PC5-RRC unicast connection with the second terminal based on a terminal identifier; or establish a PC5-RRC unicast connection with the second terminal based on a service identifier.

In an embodiment, the apparatus further includes the following: a service transmission module configured to transmit service data corresponding to a first priority in a case where the target resource conflicts with a non-target resource. Where the first priority is a higher one of a priority of the target resource and a priority the non-target resource. The non-target resource is allocated by a serving node or sensed by the first terminal. The transmitting the service data corresponding to the first priority, including: in a case where a priority of a highest priority logical channel of a MAC protocol data unit PDU corresponding to the target resource is higher than a priority of a highest priority logical channel of a MAC PDU corresponding to the non-target resource, a MAC PDU corresponding to the target resource is transmitted.

In an embodiment, the apparatus further includes the following: a non-target configuration transmitting module configured for transmitting configuration information of a non-target resource allocated by a serving node or sensed by the first terminal to the second terminal.

In an embodiment, the apparatus further includes the following: an assisted scheduling module configured to transmit an assisted scheduling request to the second terminal in a case where a PC5-RRC unicast connection with the second terminal has been established, a unicast connection with a third terminal has been established, and the first terminal is not capable of assisting scheduling the third terminal, wherein the assisted scheduling request includes a terminal identifier of the third terminal; a configuration receiving module configured to receive a resource pool configuration forwarded by the second terminal, where the resource pool configuration is transmitted to the second terminal by a serving node; a configuration indication module configured to indicate the resource pool configuration to the third terminal, and transmit assisted scheduling inquiry information to the third terminal.

The resource scheduling apparatus proposed in this embodiment belongs to the same inventive concept as the resource acquisition method applied at the first terminal proposed in the foregoing embodiment. For technical details not described in detail in this embodiment, reference may be made to any of the foregoing embodiments, and this embodiment has the same beneficial effects as executing the resource acquisition method applied at the first terminal.

Figure 12:
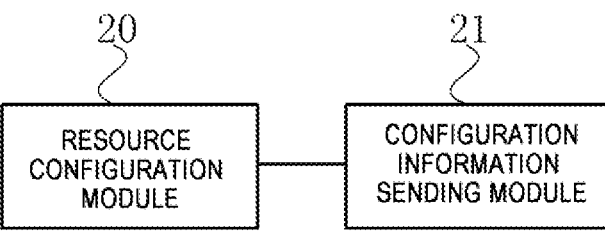
FIG. 12 is a schematic structural diagram of resource scheduling apparatus according to an embodiment of the present application.

The embodiment of the present application further provides a resource scheduling apparatus. FIG. 12 is a schematic structural diagram of resource scheduling apparatus according to an embodiment. As shown in FIG. 12, the resource scheduling apparatus includes the following: a resource configuration module 20 and a configuration information transmitting module 21.

The resource configuration module 20 is configured to predefined condition configure an available resource set of a first terminal in a case where a predefined condition is satisfied, where the available resource set includes a target resource used for transmitting service data. The configuration information transmitting module 21 is configured to transmit configuration information of the available resource set to the first terminal.

In the resource scheduling apparatus of the embodiment, in a case where a predefined condition is satisfied, the second terminal may assist in scheduling the first terminal, and configure an available resource set for the first terminal, thereby improving reliability and flexibility of resource scheduling.

In an embodiment, the available resource set is configured by a serving node or sensed by the second terminal.

In an embodiment, the predefined condition includes the following: first capability information has been reported to a first terminal; where the first capability information includes at least one of the following: information on a capability of the second terminal to assist the first terminal to sense an optional resource set; information on a capability of the second terminal to assist the first terminal to sense an optional resource in the optional resource set; and information on a capability of the second terminal to provide the available resource set for the first terminal.

In an embodiment, a predefined condition includes the following: the second capability information reported by the first terminal is received; where the second capability information includes information on a capability of the first terminal to accept assisted scheduling.

In an embodiment, a predefined condition includes at least one of the following: the second terminal is within coverage of a serving node and a first terminal is outside coverage of a serving node; a measurement value of congestion level of a resource pool is higher or lower than a congestion level threshold, where the congestion level threshold is configured by the second terminal or a serving node; and a measurement value of RSRP is higher or lower than a RSRP measurement threshold, where the RSRP measurement threshold is configured by the second terminal or a serving node.

In an embodiment, a predefined condition includes at least one of the following: the number of terminals scheduled by a second terminal is less than a maximum number of scheduled terminals; the number of remaining terminals schedulable by the second terminal is greater than 0; and a Boolean value indicated by the second terminal is a predefined value, and the Boolean value is used to indicate whether the second terminal is capable of scheduling the first terminal.

In an embodiment, the apparatus further includes the following: a first signaling receiving module configured to receive first signaling for indicating the second terminal to configure an available resource set of the first terminal. Where the first signaling includes at least one of the following: PC5-RRC signaling; side link MAC signaling; SCI.

In an embodiment, the apparatus further includes the following: a second signaling receiving module configured to receive second signaling for requesting the second terminal to configure an available resource set of the first terminal. Where the second signaling includes at least one of the following: PC5-RRC signaling; side link MAC signaling; SCI.

In an embodiment, the resource configuration module 20 is configured to transmit request information to a serving node; determine an available resource set allocated by the serving node to a first terminal through RRC signaling. Where the request information includes at least one of the following: a destination ID of the current service of the first terminal and a resource request indication; a destination ID of the first terminal and a resource request indication; a resource request indication. Where the resource request indication includes at least one of the following information: a service priority; and a buffer size for a service packet.

In an embodiment, the resource configuration module 20 is configured to: receive business attribute information; configure an available resource set of the first terminal according to the service attribute information. The service attribute information includes at least one of the following: a service latency requirement; the number of service subchannels; a service cycle duration; HARQ feedback configuration information.

In an embodiment, the resource configuration module 20 is configured to transmit configuration information of the available resource set to the first terminal through PC5-RRC signaling or side link MAC signaling or SCI. The available resource set is sensed by the second terminal or allocated by a serving node.

In an embodiment, the apparatus further includes the following: a request indication receiving module configured to receive resource request indication request of a PC5 interface of the first terminal and provide the target resource based on the resource request indication; or, sensing the available resource set.

In an embodiment, the resource configuration module 20 is configured to receive resource pool configuration information; configure an available resource set of the first terminal based on the resource pool configuration information; the apparatus further includes the following: a indication request receiving module configured to receive a resource request indication request of a PC5 interface of the first terminal and request to provide the target resource according to the resource request indication.

In an embodiment, the apparatus further includes the following: a unicast connection establishing module configured to establish a PC5-RRC unicast connection with the first terminal based on a terminal identifier; or, establishing a PC5-RRC unicast connection with the first terminal based on a service identifier.

In an embodiment, the apparatus further includes the following: a list maintaining list module configured to maintain a destination ID list between the first terminal and the second terminal and report the destination ID list to a serving node.

In an embodiment, the apparatus further includes the following: a non-target receiving module configured to receive configuration information of a non-target resource. The non-target resource is allocated by a serving node or sensed by the first terminal; The target resource sensed by the second terminal and the non-target resource do not overlap in both a time domain and a frequency domain.

In an embodiment, the apparatus further includes the following: an assisted request receiving module configured to receive an assisted scheduling request transmitted by the first terminal in a case where a PC5-RRC unicast connection with the first terminal has been established, the first terminal establishes a unicast connection with the third terminal, and the first terminal is not capable of assisting in scheduling the third terminal. The assisted scheduling request includes a terminal identifier of the third terminal; a forwarding module configured to receive resource pool configuration transmitted by a serving node and forward the resource pool configuration to the first terminal.

The resource scheduling apparatus proposed in this embodiment belongs to the same inventive concept as the resource acquisition method applied at the second terminal proposed in the foregoing embodiment. For technical details not described in detail in this embodiment, reference may be made to any of the foregoing embodiments, and this embodiment has the same beneficial effects as executing the resource scheduling method applied at the second terminal.

Figure 13:
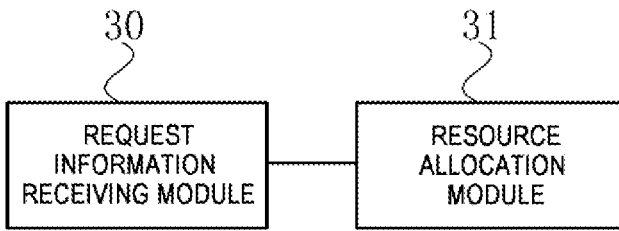
FIG. 13 is a schematic structural diagram of resource scheduling apparatus according to an embodiment of the present application.

The embodiment of the present application further provides resource scheduling apparatus. FIG. 13 is a schematic structural diagram of resource scheduling apparatus according to an embodiment. As shown in FIG. 13, the resource scheduling apparatus includes the following: request information receiving determination module 30 and a resource allocation module 31.

The request information receiving determination module 30 is configured to receive request information of a second terminal in a case where a predefined condition is satisfied.

The resource allocation module 31 is configured to allocate an available resource set of a first terminal according to the request information, and the available resource set includes a target resource for transmitting service data.

In the resource scheduling apparatus, in a case where a predefined condition is satisfied, the serving node allocates the available resource set of the first terminal based on the request information of the second terminal and transmits the configuration information to the second terminal. The configuration information is forwarded by the second terminal so that the first terminal may acquire the target resource from the available resource set under assisted scheduling of the second terminal, thereby reliability and flexibility of resource scheduling are improved.

In an embodiment, the apparatus further includes the following: a mode indication module configured to indicate a corresponding resource request mode to a first terminal;

The resource request mode includes at least one of the following: a resource request mode based on scheduling by a serving node; a resource acquisition mode based on autonomously sensing by the first terminal; and a resource request mode based on scheduling by the second terminal.

In an embodiment, a predefined condition includes at least one of the following is received: the second capability information reported by the first terminal and the first capability information reported by the second terminal. Where the second capability information includes capability information that the first terminal accepting assisted scheduling; the first capability information includes at least one of the following: information on a capability of the second terminal to assist the first terminal to sense an optional resource set; information on a capability of the second terminal to assist the first terminal to sense an optional resource in the optional resource set, and information on a capability of the second terminal to provide the available resource set for the first terminal.

In an embodiment, a predefined condition includes at least one of the following: a second terminal is within coverage of a serving node and a first terminal is outside coverage of a serving node; a measurement value of congestion level of a resource pool is higher or lower than a congestion level threshold. Where the congestion level threshold is configured by the second terminal or a serving node. A measurement value of RSRP is higher or lower than a RSRP measurement threshold, where the RSRP measurement threshold is configured by the second terminal or a serving node.

In an embodiment, the predefined condition includes at least one of the following: the number of s terminals scheduled by a second terminal is less than a maximum number of scheduling terminals; the number of remaining terminals schedulable by the second terminal is greater than 0; and a Boolean value indicated by the second terminal is a predefined value, and the Boolean value is used to indicate whether the second terminal is capable of scheduling the first terminal.

In an embodiment, the request information includes at least one of the following: a destination ID of current service of the first terminal and resource request indication; a destination ID of the first terminal and resource request indication; resource request indication. The resource request indication includes at least one of the following information: a service priority; and a buffer size for a service packet.

In an embodiment, the apparatus further includes the following: a list receiving module set to receive a destination ID list of a unicast connection between a first terminal and a second terminal reported by the second terminal; a updating module set to update resource pool configuration of terminals with the same destination ID according to the destination ID list.

In an embodiment, the apparatus further includes the following: an ID indication module configured to indicate the first terminal the terminal destination ID information to which the resource configuration is applicable in a case where a PC5-RRC unicast connection between a first terminal and a second terminal has been established, a unicast connection between the first terminal and a third terminal has been established, and the first terminal is not capable of assisting in scheduling the third terminal.

The resource scheduling apparatus proposed in this embodiment belongs to the same inventive concept as the resource scheduling method applied at the serving node proposed in the foregoing embodiment. For technical details not described in detail in this embodiment, reference may be made to any of the foregoing embodiments, and this embodiment has the same beneficial effects as executing the resource scheduling method applied at the serving node.

Figure 14:
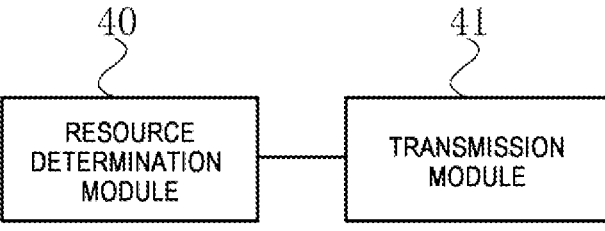
FIG. 14 is a schematic structural diagram of a resource acquisition apparatus according to another embodiment of the present application.

The embodiment of the present application further provides a resource acquisition apparatus. FIG. 14 is a schematic structural diagram of resource acquisition apparatus according to an embodiment. As shown in FIG. 14, the resource acquisition apparatus includes the following: a resource determination module 40 and a transmission module 41.

The resource determination module 40 is configured to determine the target resource pool and the target resource from a transmitting resource pool for a predefined mode configured by the serving node in a case where configured as a predefined mode. The transmission module 41 is configured to transmit service data based on the target resource.

In the resource acquisition apparatus of this embodiment, the terminal may select a target resource pool and a target resource from a transmitting resource pool configured by a serving node, and use the target resource to transmit service data, thereby improving the flexibility and reliability of resource acquisition. The terminal refers to a terminal configured in a predefined mode, and is not limited to the first terminal or the second terminal in the foregoing embodiment.

In an embodiment, the resource determination module 40 is configured to select at least one target resource pool configured with a feedback resource, or at least one target resource pool configured without a feedback resource from a transmit resource pool for a predefined mode; and select a target resource from the target resource pool.

In an embodiment, the resource acquisition apparatus further includes a resource reselecting module configured to reselect a target resource pool and a target resource based on a HARQ feedback attribute of a currently assembled MAC PDU.

In an embodiment, the resource reselecting module is configured to reselect a target resource pool and a target resource based on a configuration of a side link radio bearer SLRB corresponding to a current service in a case where a HARQ feedback attribute of the MAC PDU is feedback enabling, and a previously selected target resource is configured without a feedback resource. The reselecting a target resource pool and a target resource according to configuration of a side link radio bearer SLRB corresponding to a current service, including: selecting a resource pool configured with a feedback resource as a reselected target resource pool, and reselecting a target resource from the target resource pool in a case where the SLRB being configured with HARQ feedback enabling; selecting a resource pool not configured with a feedback resource as a reselected target resource pool, and reselecting a target resource from the target resource pool in a case where the SLRB being configured with HARQ feedback disenabling.

In an embodiment, the resource acquisition apparatus further includes the following:

a selection result reporting module configured to: in a case where a terminal selects one or more target resource pools and/or target resources from a resource pool configured by a serving node to perform transmission of mode 2 service, the terminal reports selection result of target resource pools and/or target resources to a serving node. In an example the selected target resource pools and/or index numbers of the target resources are reported to the serving node.

The resource acquisition apparatus proposed in this embodiment belongs to the same inventive concept as the resource acquisition method applied at the serving node proposed in the foregoing embodiment. For technical details not described in detail in this embodiment, reference may be made to any of the foregoing embodiments, and this embodiment has the same beneficial effects as executing the resource acquisition method applied at the terminal.

Figure 15:
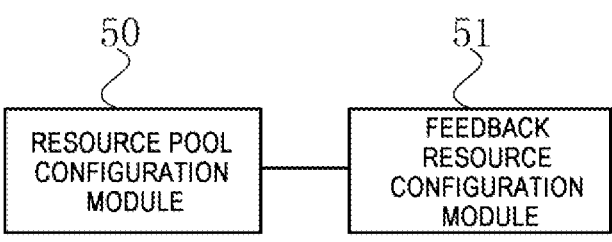
FIG. 15 is a schematic structural diagram of resource scheduling apparatus according to another embodiment of the present application.

The embodiment of the present application further provides a resource scheduling apparatus. FIG. 15 is a schematic structural diagram of resource scheduling apparatus according to an embodiment. As shown in FIG. 15, the resource scheduling apparatus includes the following: a resource pool configuration module 50 and a feedback resource configuration module 51.

The resource determination module 50 is configured to configure a transmit resource pool for the predefined mode for a terminal in a predefined mode. The feedback resource configuration module 51 is configured to configure a feedback resource of at least one resource pool in the transmit resource pool for the predefined mode.

In the resource scheduling apparatus of this embodiment, the serving node may configure a transmit resource pool for the predefined mode for a terminal in a predefined mode, and configure a feedback resource for terminals to select or reselect target resource pools and target resources, thereby improving flexibility and reliability of resource scheduling.

In an embodiment, the resource scheduling apparatus further includes the following:

A selection result receiving module configured to receive the selection result of target resource pools and/or target resources, including index numbers of the target resources/or target resources are selected.

The resource scheduling apparatus proposed in this embodiment belongs to the same inventive concept as the resource scheduling method applied at the serving node proposed in the foregoing embodiment. For technical details not described in detail in this embodiment, reference may be made to any of the foregoing embodiments, and this embodiment has the same beneficial effects as executing the resource scheduling method applied at the terminal.

The embodiment of the present application further provides a terminal. The resource acquisition method or the resource scheduling method applied at the terminal in the above embodiments may be executed by a corresponding apparatus, and the apparatus may be implemented in software and/or hardware and integrated in the terminal. The terminal in this embodiment may be the first terminal, or the second terminal, or the terminal configured as mode 2.

Figure 16:
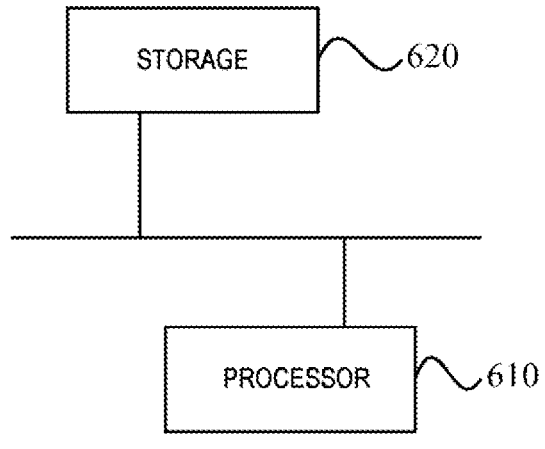
FIG. 16 is a schematic diagram of a hardware structure of a terminal according to an embodiment of the present application.

FIG. 16 is a schematic diagram of a hardware structure of a terminal according to an embodiment. As shown in FIG. 16, the terminal provided in this embodiment includes a processor 610 and a memory 620; the processor 610 in the terminal may be one or more processors and one processor 610 is taken as an example in FIG. 16. The processor 610 and the memory 620 in the device may be connected by a bus or in other ways, and the connection by a bus is taken as an example in FIG. 16.

The one or more programs are executed by the one or more processors 610, causing the one or more processors implement the resource acquisition method or the resource scheduling method applied at a terminal described in any of the foregoing embodiments, where, the terminal may be the first terminal, the second terminal, or any terminal.

As a computer-readable storage medium, the memory 620 can be used to store one or more programs, for example, software programs, computer-executable programs, and modules, such as program instructions/modules corresponding to the resource acquisition method applied at the first terminal in the embodiment of the present disclosure (for example, the modules in the resource acquisition apparatus shown in FIG. 11, including: information receiving module 10 and resource acquisition module 11). The processor 610 executes various functional applications and data processing of the terminal by running the software programs, instructions and modules stored in the storage device 620, that is, implements the resource acquisition method or the resource scheduling method applied at the terminal in the above method embodiments. Where the terminal may be the first terminal, or the second terminal, or the terminal configured as mode 2.

The memory 620 may mainly comprise a storage program area and a storage data area. Where the storage program area may store an operating system, an application program required for at least one function; the storage data area may store data created according to the use of the apparatus (such as the predefined conditions, configuration information, etc.) in the above-mentioned embodiments. Additionally, memory 620 may comprise a cache random access memory, and may also comprise a non-volatile memory, such as at least one magnetic disk storage device, a flash memory device, or other non-volatile solid state storage devices. In some instances, the storage device 620 may further include memory located remotely from the processor 610, and these remote memories may be connected to the terminal through a network. Examples of such networks include, but are not limited to, the Internet, an intranet, a local area network, a mobile communication network, and combinations thereof.

When one or more programs included in the above-mentioned terminal are executed by the one or more processors 610, the following operations are implemented: in a case where a predefined condition is satisfied, configuration information of an available resource set transmitted by a second terminal is received; a target resource is acquired based on configuration information of the available resource set, the target resource being used for transmitting service data. Or, the following operations are implemented: in a case where a predefined condition is satisfied, an available resource set of a first terminal is configured, The available resource set includes a target resource used for transmitting service data; configuration information of the available resource set is transmitted to the first terminal. Or, the following operations are implemented: in a case where being configured as a predefined mode, the terminal determining the target resource pool and the target resource from a predefined mode transmit resource pool configured by the serving node; transmitting service data based on the target resource.

The terminal proposed in this embodiment belongs to the same inventive concept as the resource acquisition method or the resource scheduling method applied at the terminal proposed in the above embodiments. Where the terminal may be the first terminal, the second terminal, or any terminal. For technical details not described in detail in this embodiment, reference may be made to any of the above-mentioned embodiments, and this embodiment has the same beneficial effects as executing the resource acquisition method or the resource scheduling method applied at the terminal.

The embodiment of the present application further provides a serving node. The resource scheduling method applied at the serving node in the above embodiments may be executed by a corresponding apparatus, and the apparatus may be implemented in software and/or hardware and integrated in the serving node. The serving node in this embodiment may be the first serving node, or the second serving node 2.

Figure 17:
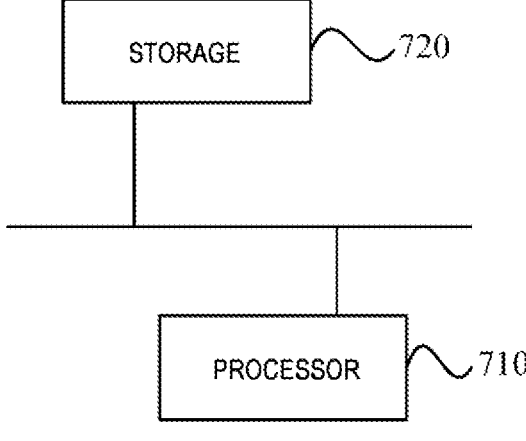
FIG. 17 is a schematic diagram of a hardware structure of a serving node according to an embodiment of the present application.

FIG. 17 is a schematic diagram of a hardware structure of a serving node according to an embodiment. As shown in FIG. 17, the serving node provided in this embodiment includes a processor 710 and a memory 720, The processor 710 in the serving node may be one or more processor and one processor 710 is taken as an example in FIG. 17; the processor 710 and the memory 720 in the apparatus may be connected by a bus or in other ways, and the connection by a bus is taken as an example in FIG. 17.

The one or more programs are executed by the one or more processors 710, so that the one or more processors implement the resource scheduling method applied at a serving node described in any of the foregoing embodiments.

As a computer-readable storage medium, the memory 720 can be used to store one or more programs, for example, software programs, computer-executable programs, and modules, such as program instructions/modules corresponding to the resource scheduling method applied at the serving node in the embodiment of the present invention (for example, the modules in the resource acquisition apparatus shown in FIG. 13, including: an request information receiving module 30 and a resource allocation module 31). The processor 710 executes various functional applications and data processing of the terminal by running the software programs, instructions and modules stored in the storage device 720, that is, implements the resource scheduling method applied at the serving node in the above method embodiments.

The memory 720 may mainly comprise a storage program area and a storage data area. Where the storage program area may store an operating system, an application program required for at least one function; the storage data area may store data created according to the use of the apparatus (such as the predefined conditions, configuration information, etc.) in the above-mentioned embodiments. Additionally, memory 720 may comprise a cache random access memory, and may also comprise a non-volatile memory, such as at least one magnetic disk storage device, a flash memory device, or other non-volatile solid state storage devices. In some instances, the storage device 720 may further include memory located remotely from the processor 710, and these remote memories may be connected to the terminal through a network. Examples of such networks include, but are not limited to, the Internet, an intranet, a local area network, a mobile communication network, and combinations thereof.

When one or more programs included in the above-mentioned serving node are executed by the one or more processors 710, the following operations are implemented: in a case where a predefined condition is satisfied, the serving node receiving request information of a second terminal; allocating an available resource set of a first terminal according to the request information. The available resource set including a target resource for transmitting service data. Or, the following operations are implemented: configure a transmit resource pool for the predefined mode for a terminal in a predefined mode; configure a feedback resource of at least one resource pool in the transmit resource pool for the predefined mode.

The serving node proposed in this embodiment belongs to the same inventive concept as the resource scheduling method applied at the serving node proposed in the above embodiments. For technical details not described in detail in this embodiment, reference may be made to any of the above-mentioned embodiments, and this embodiment has the same beneficial effects as executing the resource scheduling method applied at the serving node.

The embodiment of the present application further provides a storage medium containing computer-executable instructions, when executed by a computer processor, execute a method of resource scheduling or a method of resource acquisition.

The resource acquisition methods includes the following: in a case where a predefined condition is satisfied, the serving node receive configuration information, transmitted by a second terminal, of an available resource set; acquire a target resource according to configuration information of the available resource set, the target resource being used for transmitting service data.

The resource scheduling method includes the following: in a case where a predefined condition is satisfied, the serving node configure an available resource set of a first terminal, where the available resource set includes a target resource for transmitting service data; transmit configuration information of the available resource set to the first terminal.

Or, the resource scheduling method includes the following: in a case where a predefined condition is satisfied, the serving node receive request information of a second terminal; allocate an available resource set of a first terminal based on the request information, and the available resource set including a target resource for transmitting service data.

Or, the resource scheduling method includes the following: in a case where the serving node is configured as a predefined mode, determine the target resource pool and the target resource from a predefined mode transmit resource pool configured by the serving node; transmit service data based on the target resource.

Or, the resource scheduling method includes the following: the serving node configure a transmit resource pool for the predefined mode for a terminal in a predefined mode; configure a feedback resource of at least one resource pool in the transmit resource pool for the predefined mode.

From the above description of the embodiments, those skilled in the art can understand that the present application can be implemented by means of software and general hardware, and can also be implemented by hardware. Based on this understanding, the technical solution of the present application can be embodied in the form of a software product, and the computer software product can be stored in a non-transient computer-readable storage medium, such as a floppy disk of a computer, a read-only memory (ROM), Random access memory (RAM), flash memory (FLASH), hard disk or optical disk, etc., including multiple instructions to enable a computer device (which may be a personal computer, server, or network device, etc.) to execute any methods described in the examples.

The block diagrams of any logic flow in the figures of the present application may represent program, or may represent interconnected logic circuits, modules and functions, or may represent a combination of program and logic circuits, modules and functions. Computer programs can be stored on memory. The memory may be of any type suitable for the local technical environment and may be implemented using any suitable data storage technology, such as, but not limited to, read only memory (ROM), random access memory (RAM), optical memory devices and systems (Digital Versatile Discs DVD or CD disc) etc. Computer-readable media may include non-transitory storage media. The data processor may be of any type suitable for the local technical environment, such as but not limited to a general purpose computer, special purpose computer, microprocessor, digital signal processor (DSP), application specific integrated circuit (ASIC), programmable logic device (FGPA) and processors based on multi-core processor architectures.

We claim:

1. A method of resource acquisition, applied at a first terminal, the method comprising:

establishing a PC5-radio resource control (RRC) unicast connection with a second terminal based on a terminal identifier or a service identifier;

receiving configuration information, transmitted by the second terminal, of an available resource set in a case where a predefined condition is satisfied;

acquiring, based on the configuration information of the available resource set, a target resource for transmitting service data;

transmitting an assisted scheduling request to the second terminal in a case where a PC5-RRC unicast connection with the second terminal has been established, a unicast connection with a third terminal has been established, and the first terminal is not capable of assisting in scheduling the third terminal, the assisted scheduling request comprising a terminal identifier of the third terminal;

receiving a resource pool configuration forwarded by the second terminal, the resource pool configuration being transmitted by a serving node to the second terminal serving node; and indicating the resource pool configuration to the third terminal, and transmitting assisted scheduling inquiry information to the third terminal.

2. The method of claim 1, wherein the predefined condition comprises:

receiving first capability information reported by the second terminal, wherein the first capability information comprises at least one of the following:

information on a capability of the second terminal to assist the first terminal to sense an optional resource set, information on a capability of the second terminal to assist the first terminal to sense an optional resource in the optional resource set, and information on a capability of the second terminal to provide the available resource set for the first terminal.

3. The method of claim 1, wherein the predefined condition comprises:

reporting second capability information to the second terminal, wherein the second capability information comprises information on a capability of the first terminal to accept assisted scheduling.

4. The method of claim 1, wherein the predefined condition comprises at least one of the following:

the second terminal being within coverage of a serving node and the first terminal being outside coverage of a serving node, a measurement value of a congestion level of a resource pool being higher or lower than a congestion level threshold, wherein the congestion level threshold is configured by the second terminal or a serving node, and a measurement value of reference signal received power (RSRP) being higher or lower than a RSRP measurement threshold, wherein the RSRP measurement threshold is configured by the second terminal or a serving node;

or, wherein the predefined condition comprises at least one of the following:

a number of terminals scheduled by the second terminal being less than a maximum number of scheduled terminals, a number of remaining terminals schedulable by the second terminal being greater than 0, and a Boolean value indicated by the second terminal being a predefined value, the Boolean value being used to indicate whether the second terminal is capable of scheduling the first terminal.

5. The method of claim 1, further comprising:

transmitting first signaling indicating the second terminal to configure an available resource set of the first terminal, wherein the first signaling comprises at least one of the following:

PC5-RRC PC5 signaling; side link medium access control (MAC), signaling; and side link control information (SCI); or the method further comprising:

requesting the second terminal to configure an available resource set of the first terminal through second signaling in a case where the predefined condition is not satisfied, wherein the second signaling comprises at least one of the following:

PC5-RRC signaling, side link MAC signaling, and SCI.

6. The method of claim 1, wherein the available resource set is allocated to the first terminal by a serving node in response to request information from the second terminal, wherein the request information comprises at least one of the following:

a destination identifier (ID) of a current service of the first terminal and a resource request indication, a destination ID of the first terminal and a resource request indication, a resource request indication, wherein the resource request indication comprises at least one of the following information:

a service priority; and a buffer size for a service packet.

7. The method of claim 1, further comprising:

reporting service attribute information to the second terminal through third signaling, wherein the service attribute information comprises at least one of the following:

a service latency requirement; a number of service subchannels; a service cycle duration; and hybrid automatic repeat request (HARQ) feedback configuration information;

the method further comprising:

reporting resource pool configuration information to the second terminal through fourth signaling, the target resource being sensed by the second terminal in the available resource set based on the resource pool configuration information, wherein acquiring the target resource based on the configuration information of the available resource set comprises:

requesting to acquire the target resource by transmitting a resource request indication of a PC5 interface to the second terminal.

8. The method of claim 1, wherein receiving the configuration information, sent by the second terminal, of the available resource set comprises:

receiving the configuration information of the available resource set through PC5-RRC signaling, side link MAC signaling or SCI, the available resource set being sensed by the second terminal or allocated by a serving node.

9. The method of claim 1, further comprising:

transmitting service data corresponding to a first priority in a case where the target resource conflicts with a non-target resource, wherein the first priority is a higher one of a priority of the target resource and a priority of the non-target resource, wherein the non-target resource is allocated by a serving node or sensed by the first terminal, wherein transmitting the service data corresponding to the first priority comprises:

transmitting a MAC protocol data unit (PDU), corresponding to the target resource in a case where a priority of a highest priority logical channel of a MAC PDU corresponding to the target resource is higher than a priority of a highest priority logical channel of a MAC PDU corresponding to the non-target resource.

10. The method of claim 1, further comprising:

transmitting, to the second terminal, configuration information of a non-target resource allocated by a serving node or sensed by the first terminal.

11. A terminal comprising:

at least one processor, a storage configured for storing at least one program, the at least one program, when executed by the at least one processor, causing the at least one processor to implement the method of resource acquisition of claim 1.

12. A method of resource scheduling, applied at a second terminal, the method comprising:

establishing a PC5-radio resource control (RRC) unicast connection with a first terminal based on a terminal identifier or a service identifier;

configuring an available resource set of a first terminal in a case where a predefined condition is satisfied, the available resource set comprising a target resource for transmitting service data;

transmitting configuration information of the available resource set to the first terminal; and receiving an assisted scheduling request transmitted by the first terminal in a case where a PC5-RRC unicast connection with the first terminal has been established, a unicast connection between the first terminal and a third terminal is established, and the first terminal is not capable of assisting in scheduling the third terminal, the assisted scheduling request comprising a terminal identifier of the third terminal; and receiving a resource pool configuration transmitted by a serving node and forwarding the resource pool configuration to the first terminal.

13. The method of claim 12, wherein the available resource set is configured by a serving node or sensed by the second terminal.

14. The method of claim 12, further comprising:

receiving first signaling indicating the second terminal to configure an available resource set of the first terminal, wherein the first signaling comprises at least one of the following:

PC5-radio resource control (RRC) signaling; side link medium access control (MAC) signaling; and side link control information (SCI);

or the method further comprising:

receiving second signaling for requesting the second terminal to configure an available resource set of the first terminal, wherein the second signaling comprises at least one of the following:

PC5-RRC signaling, side link MAC signaling, and SCI.

15. The method of claim 12, wherein configuring the available resource set of the first terminal comprises:

transmitting request information to a serving node; and determining an available resource set allocated by the serving node to the first terminal through RRC signaling, wherein the request information comprises at least one of the following:

a destination identifier (ID) of a current service of the first terminal and a resource request indication, a destination ID of the first terminal and a resource request indication, a resource request indication, wherein the resource request indication at least comprises at least one of the following information:

a service priority; and a buffer size for a service packet;

or, wherein configuring the available resource set of the first terminal comprises:

receiving service attribute information; and configuring the available resource set of the first terminal based on the service attribute information, wherein the service attribute information comprises at least one of the following:

a service latency requirement; a number of service sub-channels; a service cycle duration; and hybrid automatic repeat request (HARQ) feedback configuration information.

16. The method of claim 12, wherein transmitting the configuration information of the available resource set to the first terminal comprises:

transmitting the configuration information of the available resource set to the first terminal through PC5-RRC signaling, side link MAC signaling or SCI, the available resource set being sensed by the second terminal or allocated by a serving node.

17. The method of claim 12, wherein configuring the available resource set of the first terminal comprises:

receiving resource pool configuration information; and configuring the available resource set of the first terminal based on the resource pool configuration information, wherein the method further comprises:

receiving resource request indication request of a PC5 interface of the first terminal and providing the target resource based on the resource request indication request.

18. A terminal comprising:

at least one processor;

a storage configured for storing at least one program, the at least one program, when executed by the at least one processor, causing the at least one processor to implement the method of resource scheduling of claim 12.

* * * * *